(12) United States Patent
Fukushima

(10) Patent No.: US 6,481,552 B1
(45) Date of Patent: Nov. 19, 2002

(54) CLUTCH APPARATUS

(75) Inventor: Hirotaka Fukushima, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/695,082

(22) Filed: Oct. 25, 2000

(30) Foreign Application Priority Data

| Nov. 15, 1999 | (JP) | ................................ 11-324608 |
| Nov. 15, 1999 | (JP) | ................................ 11-324609 |
| Nov. 15, 1999 | (JP) | ................................ 11-324610 |

(51) Int. Cl.$^7$ .......................... F16D 13/60; F16D 13/50
(52) U.S. Cl. ................... 192/70.17; 192/70.27; 192/70.3; 192/91 A; 192/214
(58) Field of Search .................... 192/70.17, 70.27, 192/70.3, 91 A, 55.61, 207, 209, 212, 214; 464/66, 67, 68

(56) References Cited

U.S. PATENT DOCUMENTS

| 3,892,302 A | * | 7/1975 | Rist ............................ 192/91 A |
| 4,714,147 A |   | 12/1987 | Szodfridt et al. ......... 192/87.15 |
| 4,729,464 A | * | 3/1988 | Friedmann ............... 192/110 B |
| 4,844,225 A | * | 7/1989 | Fukushima ............... 192/30 V |
| 4,966,270 A |   | 10/1990 | Rispeter et al. .......... 192/87.15 |

FOREIGN PATENT DOCUMENTS

DE      41 28 880 A1   * 4/1992

\* cited by examiner

*Primary Examiner*—Rodney H. Bonck
(74) *Attorney, Agent, or Firm*—Shinjyu Global IP Counselors, LLP

(57) ABSTRACT

A clutch apparatus 1 includes a clutch cover assembly 8 and a damper mechanism 24. The clutch cover assembly 8 includes a pressure plate 51, a clutch cover 28, and a cone spring 52. The damper mechanism 24 includes elastic members 30 that are retained by a crankshaft 2 or the clutch cover assembly 8 and axially releasably engages the other. A release mechanism 10 includes a cover member 57, a release member 60, and a lever member 59. The inner peripheral end of the cover member 57 is supported by a member disposed on a transmission side. The release mechanism 10 moves the plate 51 away from the clutch disk 82 by applying a load to the assembly 8. The relative rotation limiting mechanism connects the assembly 8 to a member disposed on the crankshaft side by the load applied from the release mechanism 10 to the assembly 8.

26 Claims, 11 Drawing Sheets

CLUTCH APPARATUS

BACKGROUND OF THE INVENTION

1. Field of the Invention

This invention generally relates to a clutch apparatus connected to a crankshaft via an elastic member. More specifically, the present invention relates to a clutch apparatus including a clutch cover assembly axially disposed on the engine side of a clutch disk and a damper mechanism disposed between the crankshaft and the clutch cover assembly.

2. Background Information

A clutch apparatus is an apparatus that enables transmission of driving force from an engine to an input shaft of a transmission and disables the transmission of the driving force as required. The clutch apparatus basically includes a friction drive plate receiving the driving force from a crankshaft of the transmission, a clutch disk disposed adjacent to the friction drive plate, and a clutch cover assembly for urging the clutch disk against the friction drive plate and releasing the clutch disk from the friction drive plate as required. The clutch cover assembly includes a clutch cover arranged to rotate integrally with the friction drive plate, a pressure plate housed in the clutch cover adjacent to the clutch disk, and an urging member supported by the clutch cover for urging the pressure plate toward the clutch disk and the friction drive plate.

One known type of the clutch cover assembly is axially disposed on the engine side of the drive plate. In this instance, a release mechanism for releasing the clutch by applying a load to the clutch cover assembly is axially disposed on the transmission side of the friction drive plate. By way of example, the release mechanism comprises a cover member, a release member and a lever member. The cover member is secured to the axial transmission side of the friction drive plate. The release member extends through the friction drive plate and has one end forming an engaging section for engaging with the pressure plate. The lever member is levered against other end of the release member while being fulcrumed on a portion of the cover member. As the load is applied to the lever member from the drive mechanism, the lever member axially forces the release member toward the engine side while being fulcrumed on the cover member. As a result, the pressure plate overcomes the urging force of the urging member and disengages from the clutch disk. In this way, the clutch engagement is released in the clutch apparatus.

In the described prior art clutch apparatus, the clutch cover is supported, for example, at its inner peripheral end by the crankshaft or other member. Therefore, when bending vibrations are transmitted from the engine to the clutch apparatus, the entire clutch apparatus is subjected to the bending vibrations, resulting in vibrational resonances of the entire clutch apparatus.

Such clutch cover assembly may be secured to the crankshaft of the engine, for example, via a damper mechanism. A damper mechanism is disposed, for example, between the friction drive plate and a member disposed on the engine side for absorbing and reducing torque fluctuations transmitted from the engine. The damper mechanism generally includes an input side member secured to the member disposed on the engine side, an output side member secured to the clutch cover assembly, and an elastic member or springs for elastically connecting the input side member and the output side member with each other in a rotational direction. In such case, when torque fluctuations are transmitted from the engine, the springs in the damper mechanism are compressed in a rotational direction so as to absorb and reduce the torque fluctuations. Some noise and vibration problems in the drive train of the vehicle are, for example, gear-tooth noises and internal resonance noises that occur while the vehicle is running.

In order to reduce such noises and vibrations, it is necessary to minimize the torsional rigidity in the acceleration and deceleration torque ranges so as to set a torsional resonance frequency of the drive train below a practical engine speed range. In the damper mechanism, it is conceivable to increase the torsion angles of the elastic members or to arrange a plurality of elastic members operating serially in order to reduce the torsional rigidity of the damper mechanism.

On the other hand, if the elastic members have such reduced torsional rigidities, a resonance point must be passed in a low engine speed range (for example, equal to or below 500 rpm) at the engine start up and also at the engine stall. During this period, excessive torque fluctuations may occur, possibly causing damage of the damper mechanism and/or increase of the noises and vibrations. Such problems are avoided, for example, by use of one type of known lock mechanism that locks members disposed on the opposing sides of the damper mechanism while the engine speed is in the low engine speed range and unlocks these members while the engine speed is in a high engine speed range to allow operation of the damper mechanism. This lock mechanism generally includes a lock member and an elastic member. The lock member can be urged to a locking and engaging position by the elastic member to prevent relative rotation of the clutch cover assembly with respect to a member disposed on the crankshaft side and can unlock the clutch cover assembly by moving the clutch cover assembly to an unlock position with aid of centrifugal force as the engine speed reaches the high engine speed range. The use of such lock mechanism will disadvantageously results in the more complex structure and the increased number of components.

In the assembly operation of the described prior art clutch apparatus, the damper mechanism has been pre-mounted to one of the clutch apparatus and the member disposed on the engine side. In this state, when the engine is joined to the transmission, the damper mechanism must be secured to the other of the clutch apparatus and the member disposed on the engine side, for example, with bolts, rivets or the like.

Since the fastening members, such as the bolts, the rivets or the like, must be used in the assembly of the clutch apparatus, the work efficiency of the assembly operation is intrinsically low.

In view of the above, there exists a need for a clutch apparatus which overcomes the above mentioned problems in the prior art. This invention addresses this need in the prior art as well as other needs, which will become apparent to those skilled in the art from this disclosure.

SUMMARY OF THE INVENTION

Accordingly, one object of the present invention is to provide a clutch apparatus that is constructed to make the assembly of the clutch apparatus much easier.

Another object of the present invention is to provide a clutch apparatus that reduces the negative effects due to the bending vibrations transmitted from the engine in the clutch apparatus that has the clutch cover assembly axially disposed on the engine side of the clutch disk.

Another object of the present invention is to provide a clutch apparatus that suppresses the resonant vibrations in the low engine speed range by simplifying the structure in the clutch apparatus that connects the clutch cover assembly to the crankshaft via the damper mechanism.

In accordance with a first aspect of the present invention, there is provided a clutch apparatus for enabling and disabling transmission of driving force from a crankshaft of an engine to an input shaft of a transmission by engaging and disengaging a clutch disk, respectively. The clutch apparatus includes a clutch cover assembly for engaging and disengaging the clutch disk, and a damper mechanism for elastically connecting the clutch cover assembly to the crankshaft in a rotational direction. In this clutch apparatus, since the clutch cover is connected to the crankshaft via the damper mechanism, the structure is relatively simple in comparison to that of the prior art.

In accordance with a second aspect of the present invention, the clutch apparatus of the first aspect of the present invention has the damper mechanism including an elastic member that is retained by one of the crankshaft and the clutch cover assembly and axially releasably engages the other of the crankshaft and the clutch cover assembly. In this clutch apparatus, the damper mechanism is assembled by axially moving the crankshaft and the flywheel toward each other. That is, the clutch apparatus is easy to assemble in comparison to the prior art.

In accordance with a third aspect of the present invention, the clutch apparatus of the first and second aspects of the present invention has a clutch apparatus wherein the damper mechanism includes a disk-shaped plate member axially disposed on the engine side of a distal end of the crankshaft, the elastic member retained by the plate member at both circumferential ends and an axial transmission side thereof, and a drive member that includes an engaging section axially releasably engaging both circumferential ends of the elastic member and is secured to the crankshaft. In this clutch apparatus, the elastic member has been previously retained by the plate member prior to the assembly operation, and the engaging section of the drive member axially engages both the circumferential ends of the elastic member during the assembly operation. Therefore, the assembly is eased.

In accordance with a fourth aspect of the present invention, the clutch apparatus of the third aspect of the present invention has a clutch apparatus wherein the plate member includes a retaining section for retaining an axial engine side of the elastic member. In this clutch apparatus, the retaining section does not allow the elastic member to fall off from the plate member.

In accordance with a fifth aspect of the present invention, the clutch apparatus of the first through the fourth aspects of the present invention has a clutch apparatus that further includes a friction drive plate axially disposed on the transmission side of the clutch disk. The plate member is axially disposed on the engine side of the clutch disk and is secured to the friction drive plate.

In accordance with a sixth aspect of the present invention, the clutch apparatus of the fifth aspect of the present invention has a clutch apparatus wherein the clutch cover assembly includes a pressure plate axially disposed on the engine side of the clutch disk, and an urging member supported by the plate member for urging the pressure plate toward the clutch disk. In this clutch apparatus, the plate member provides two functions, i.e., the retaining function for retaining the elastic member as well as the supporting function for supporting the urging member, so that the number of parts is advantageously reduced.

In accordance with a seventh aspect of the present invention, the clutch apparatus of the sixth aspect of the present invention has a clutch apparatus wherein the elastic member is disposed radially inward of the pressure plate. In this clutch apparatus, since the elastic member is disposed radially inward of the pressure plate, it is possible to reduce the radial size of the entire clutch apparatus while minimizing the axial size of the entire clutch apparatus.

In accordance with an eighth aspect of the present invention, the clutch apparatus of the fifth through the seventh aspects of the present invention has a clutch apparatus wherein the plate member has an outer peripheral end secured to the friction drive plate and an inner peripheral end rotatably supported by the crankshaft.

In accordance with a ninth aspect of the present invention, the clutch apparatus of the eighth aspect of the present invention has a clutch apparatus that further includes a bearing disposed between the inner peripheral end of the plate member and the input shaft. In this clutch apparatus, the input shaft is supported by the inner peripheral end of the plate member via the bearing.

In accordance with a tenth aspect of the present invention, there is provided a clutch apparatus for enabling and disabling transmission of driving force from a crankshaft of an engine to an input shaft of a transmission by engaging and disengaging a clutch disk, respectively. The clutch apparatus includes a friction drive plate and a clutch cover assembly. The friction drive plate is axially disposed on the transmission side of the clutch disk. The clutch cover assembly includes a clutch cover axially disposed on the engine side of the friction drive plate, a pressure plate disposed adjacent to an axial engine side of the clutch disk, an urging member supported by the clutch cover for urging the pressure plate toward the friction drive plate, and an elastic member that is retained by an axial engine side of an inner peripheral section of the clutch cover and receives the driving force from the crankshaft.

In accordance with an eleventh aspect of the present invention, the clutch apparatus of the tenth aspect of the present invention has a clutch apparatus wherein the elastic member is retained by the inner peripheral section of the clutch cover and is positioned radially inward of the pressure plate. In this clutch apparatus, since the elastic member is disposed radially inward of the pressure plate, it is possible to reduce the radial size of the entire clutch apparatus while minimizing the axial size of the entire clutch apparatus.

In accordance with a twelfth aspect of the present invention, the clutch apparatus of the first through the eleventh aspects of the present invention has a clutch apparatus that further includes a mass body secured to the crankshaft. In this clutch apparatus, the mass body is directly secured to the crankshaft and does not engages the flywheel assembly or the damper mechanism. Therefore, the structure is simplified, and the entire size is reduced.

In accordance with a thirteenth aspect of the present invention, the clutch apparatus of the twelfth aspect of the present invention has a clutch apparatus wherein the mass body includes a disk-shaped member secured at its inner peripheral end to the crankshaft, and an annular member secured to an outer peripheral end of the disk-shaped member. In this clutch apparatus, since the annular member is secured to the outer peripheral end of the disk-shaped member, it is possible to reduce the axial size of the entire apparatus while maintaining the sufficient inertia.

In accordance with a fourteenth aspect of the present invention, there is provided a clutch apparatus for enabling and disabling transmission of driving force from a crankshaft of an engine to an input shaft of a transmission by engaging and disengaging a clutch disk, respectively, the clutch apparatus comprising a friction drive plate, a clutch cover assembly and a release mechanism. The friction drive plate is axially disposed on the transmission side of the clutch disk. The clutch cover assembly includes a clutch cover secured to an axial engine side of the pressure plate, a pressure plate axially disposed on the engine side of the clutch disk, and an urging member supported by the clutch cover for urging the pressure plate toward the clutch disk. The release mechanism includes a cover member that is secured to an axial transmission side of the friction drive plate and has an inner peripheral end supported by a member disposed on the transmission side, a release member having one end engaging an axial engine side surface of the pressure plate and other end disposed adjacent to the cover member, and a lever member supported by the cover member and the other end of the release member. In this clutch apparatus, the inner peripheral end of the cover member is supported by the member disposed on the transmission side. In this way, the cover member, which is the member axially disposed on the transmission side of the clutch apparatus, is advantageously supported, so that even if the bending vibrations are transmitted from the engine, the entire clutch apparatus is not readily tilted and therefore can suppress the vibrational resonances induced by the bending vibrations.

In accordance with a fifteenth aspect of the present invention, the clutch apparatus of the fourteenth aspect of the present invention has a clutch apparatus wherein the drive mechanism further includes a release bearing that has an inner race, an outer race for providing a load to the lever member and a plurality of rolling elements disposed between the inner and outer races. Furthermore, the inner peripheral end of the cover member is supported by the outer race. In this clutch apparatus, the cover member is supported by the release bearing, so that there is no need for providing a specialized support component.

In accordance with a sixteenth aspect of the present invention, the clutch apparatus of the fifteenth aspect of the present invention has a clutch apparatus that further includes a cylindrical member that is secured to the outer race and has an outer peripheral surface for axially slidably supporting an inner peripheral surface of the cover member. In this clutch apparatus, the inner peripheral surface of the cover member is supported by the cylindrical member attached to the release bearing.

In accordance with a seventeenth aspect of the present invention, the clutch apparatus of the sixteenth aspect of the present invention has a clutch apparatus wherein the cylindrical member includes a cylindrical section having the outer peripheral surface and an engaging section for engaging the lever member. In this clutch apparatus, the cylindrical member supports the inner peripheral end of the cover member and drives the lever member.

In accordance with an eighteenth aspect of the present invention, the clutch apparatus of the fourteenth through the seventeenth aspects of the present invention has a clutch apparatus wherein the clutch cover has an outer peripheral end secured to the friction drive plate and an inner peripheral end rotatably supported by the crankshaft. In this clutch apparatus, the inner peripheral end of the clutch cover is supported by the crankshaft, so that the clutch apparatus is advantageously supported by the other members on both axial sides and therefore can suppress the vibrational resonances when the bending vibrations are transmitted from the engine.

In accordance with a nineteenth aspect of the present invention, the clutch apparatus of the eighteenth aspect of the present invention has a clutch apparatus wherein the inner peripheral end of the clutch cover is radially supported by the crankshaft and also axially supported on its engine side by the crankshaft. In this clutch apparatus, the clutch cover is radially and axially positioned by the crankshaft.

In accordance with a twentieth aspect of the present invention, the clutch apparatus of the eighteenth and the nineteenth aspects of the present invention has a clutch apparatus that further includes a bearing disposed between the inner peripheral end of the clutch cover and the input shaft. In this clutch apparatus, the input shaft is supported by the inner peripheral end of the clutch cover via the bearing.

In accordance with a twenty-first aspect of the present invention, there is provided a clutch apparatus for enabling and disabling transmission of driving force from a crankshaft of an engine to an input shaft of a transmission by engaging and disengaging a clutch disk, respectively, the clutch apparatus comprising a friction drive plate, a clutch cover assembly, a damper mechanism, a damper mechanism, a release mechanism and a relative rotation limiting mechanism. The friction drive plate is axially disposed on one side of the clutch disk. The clutch cover assembly includes a clutch cover secured to the clutch disk side of the friction drive plate, a pressure plate axially disposed on the other side of the clutch disk that is opposite to the friction drive plate, and an urging member supported by the clutch cover for urging the pressure plate toward the clutch disk. The damper mechanism includes an elastic member for elastically connecting the clutch cover assembly to the crankshaft in a rotational direction. The release mechanism can move the pressure plate away from the clutch disk by applying a load to the clutch cover assembly. The relative rotation limiting mechanism is a mechanism for connecting the clutch cover assembly to a member disposed on the crankshaft side by the load applied from the release mechanism to the clutch cover assembly. In this clutch apparatus, when the clutch is released by applying the load to the clutch cover assembly from the release mechanism, the relative rotation limiting mechanism connects the clutch cover assembly to the member disposed on the crankshaft side, such as the crankshaft itself or other member secured to the crankshaft, with aid of the load. As a result, the operation of the damper mechanism is restricted when the clutch is released, so that the vibrational resonances in the low engine speed range at the engine start up or at the engine stall are suppressed. Since the locking of the damper mechanism is achieved by use of the load that is applied from the release mechanism when the clutch is released, the structure is relatively simple in comparison to that of the prior art.

In accordance with a twenty-second aspect of the present invention, the clutch apparatus of the twenty-first aspect of the present invention has a clutch apparatus wherein the release mechanism can move the pressure plate away from the clutch disk by axially applying the load to the clutch cover assembly toward the engine side. The relative rotation limiting mechanism urges the clutch cover assembly from the transmission side against the member disposed on the crankshaft side by the load axially applied from the release mechanism to the clutch cover assembly toward the engine side. In this clutch apparatus, when the release mechanism axially moves the clutch cover assembly toward the engine side, the relative rotation limiting mechanism urges the clutch cover assembly from the transmission side against the member disposed on the crankshaft side. Since the locking of the damper mechanism is achieved by use of the load that is applied from the release mechanism when the clutch is released, so that the structure is relatively simple in comparison to that of the prior art.

In accordance with a twenty-third aspect of the present invention, the clutch apparatus of the twenty-first and the twenty-second aspects of the present invention has a clutch apparatus that further includes a lock member that is secured to the crankshaft and acts as the member disposed on the crankshaft side.

In accordance with a twenty-fourth aspect of the present invention, the clutch apparatus of the twenty-third aspect of the present invention has a clutch apparatus wherein the lock member is a disk-shaped member.

In accordance with a twenty-fifth aspect of the present invention, the clutch apparatus of the twenty-fourth aspect of the present invention has a clutch apparatus wherein the clutch cover assembly is axially disposed on the engine side of the friction drive plate, and wherein a part of the clutch cover constitutes the relative rotation limiting mechanism. In this clutch apparatus, the clutch cover constitutes the relative rotation limiting mechanism and retains the spring member.

In accordance with a twenty-sixth aspect of the present invention, the clutch apparatus of the twenty-fifth aspect of the present invention has a clutch apparatus that further includes a friction member disposed between the part of the clutch cover and the member disposed on the clutch cover side. In this clutch apparatus, the clutch cover can be securely and frictionally engaged with the lock member by the friction member.

These and other objects, features, aspects and advantages of the present invention will become apparent to those skilled in the art from the following detailed description, which, taken in conjunction with the annexed drawings, discloses a preferred embodiment of the present invention. The features of the present invention that are believed to be novel are set forth with particularity in the appended claims.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

First Embodiment

Figure 1:
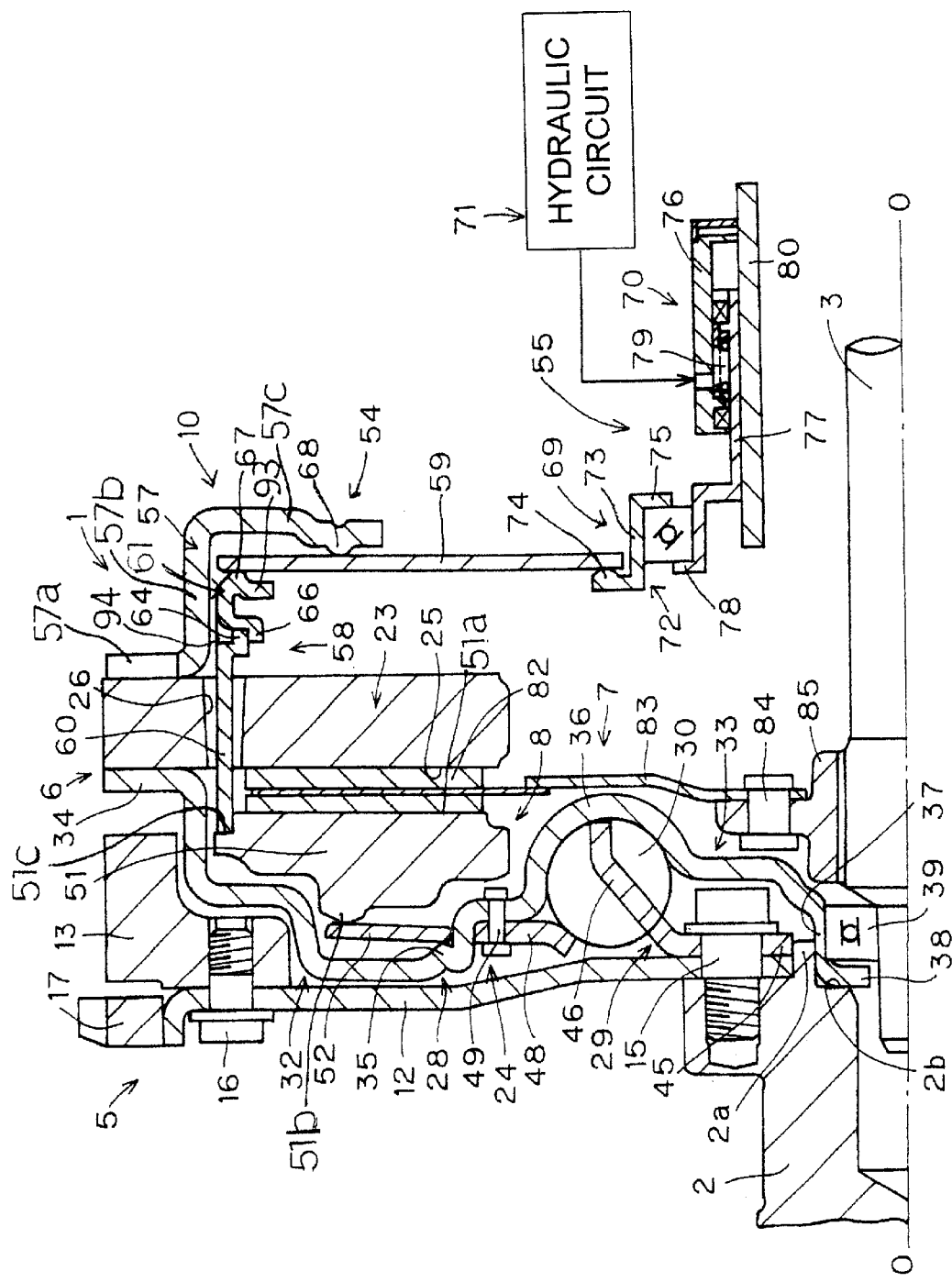
FIG. 1 is a schematic longitudinal cross-sectional view of a clutch apparatus and a flywheel coupled together in accordance with a first embodiment of the present invention.

With reference to FIG. 1, there is shown a longitudinal cross-sectional view of a clutch apparatus 1 according to a first embodiment of the present invention. The clutch apparatus 1 is an apparatus for enabling and disabling transmission of torque from a crankshaft 2 of an engine to an input shaft 3 of a transmission. The engine (not shown) is disposed on the left side of FIG. 1, and the transmission (not shown) is disposed on the right side of FIG. 1. The clutch apparatus 1 basically includes a mass body 5, a clutch disk assembly 7, a clutch cover assembly 8 and a release mechanism 10.

The mass body 5 is secured to a distal end of the crankshaft 2. The mass body 5 is a member for ensuring presence of a large moment of inertia on the crankshaft 2. The mass body 5 includes a disk-shaped member 12 and an annular member 13. The disk-shaped member 12 is secured at its inner peripheral end to the distal end of the crankshaft 2 with a plurality of bolts 15. The bolts 15 are axially threadedly inserted from the transmission side. The inner peripheral edge of the disk-shaped member 12 engages an outer peripheral surface of an annular protrusion 2a formed on the distal end surface of the crankshaft 2. The annular member 13 is secured to the axial transmission side of the outer peripheral end of the disk-shaped member 12. The annular member 13 is an inertia member having a relatively large axial thickness. The annular member 13 is secured to the disk-shaped member 12 with a plurality of circumferentially arranged bolts 16. The bolts 16 are axially threadedly inserted from the engine side. A ring gear 17 is provided for starting the engine. The ring gear 17 is secured to the outer peripheral edge of the disk-shaped member 12. The entire mass body can be formed as an integral member.

The friction drive plate 23 is a disk-shaped annular member that is axially disposed on the transmission side of the mass body 5, and is spaced apart from the mass body 5. An outer diameter of the friction drive plate 23 is substantially equal to that of the annular member 13. However, an inner diameter of the friction drive plate 23 is smaller than that of the annular member 13 but greater than that of the disk-shaped member 12. The friction drive plate 23 has an annular flat friction surface 25 on the axial engine side thereof. The friction drive plate 23 has a plurality of axially extending through holes 26 are circumferentially arranged thereon. These through hole 26 are located in a section radially outward of the friction surface 25.

The clutch disk assembly 7 basically includes a clutch disk 82, a connecting plate 83 and a hub 85. The clutch disk 82 includes a plate and a pair of friction facings provided on the opposing sides of the plate, respectively. The clutch disk 82 is placed adjacent to the friction surface 25 of the friction drive plate 23. The connecting plate 83 is an annular disk-shaped plate member and is disposed adjacent to an axial transmission side of an inner peripheral side section 33 of the clutch cover 28, which will be described in greater detail below. An outer peripheral section of the connecting plate 83 is secured to the plate of the clutch disk 82, for example, with rivets (not shown). Furthermore, an inner peripheral section of the connecting plate 83 is secured to the hub 85 with a plurality of rivets 84. At the inner peripheral surface of the hub 85, there is a spline hole for engaging with the input shaft 3.

The clutch cover assembly 8 will now be described. The clutch cover assembly 8 basically includes an outer peripheral section 32 of the clutch cover 28 attached to the axial engine side of the friction drive plate 23, a pressure plate 51 and a cone spring 52.

The clutch cover (plate member) 28 is a disk-shaped annular plate member that is axially disposed adjacent to the transmission side of the mass body 5. An outer diameter of the clutch cover 28 is substantially equal to that of the annular member 13 while an inner diameter of the clutch cover 28 is smaller than that of the disk-shaped member 12. The clutch cover 28 is divided into the outer and inner peripheral side sections 32, 33 at its radially midpoint. The outer peripheral side section 32 is generally axially convexed toward the engine side, providing an axial space between the outer peripheral side section 32 and the friction drive plate 23. The inner peripheral side section 33 is axially convexed toward the transmission side, providing an axial space between the inner peripheral side section 33 and the disk-shaped member 12. The outermost peripheral edge portion 34 of the outer peripheral side section 32 is secured to the outer peripheral section of the friction drive plate 23, for example, with bolts (not shown). The inner peripheral end of the inner peripheral side section 33 includes a cylindrical section 37 and a flange 38 radially inwardly extending from the inner end of the cylindrical section 37. The outer peripheral surface of the cylindrical section 37 engages the inner peripheral surface of the annular protrusion 2a, and the flange 38 engages the axial distal end surface 2b of the crankshaft 2 that is arranged radially inward of the annular protrusion 2a on the transmission side. With this construction, the inner peripheral end of the clutch cover 28 is axially and radially positioned relative to the crankshaft 2. Furthermore, a bearing 39 is arranged between the cylindrical section 37 and the input shaft 3. The bearing 39 is a radial bearing that includes inner and outer races and a plurality of rolling elements and rotatably supports the input shaft 3 relative to the clutch cover 28.

The pressure plate 51 is an annular member axially disposed on the axial engine side of the clutch disk 82. The pressure plate 51 has an annular flat pressing surface 51a facing the clutch disk 82.

The cone spring 52 (urging member) is axially positioned between the outer peripheral section 32 and the pressure plate 51. The outer peripheral end of the cone spring 52 is supported by the annular protrusion 51b of the pressure plate 51, and the inner peripheral end of the cone spring 52 is supported by an annular protrusion 35 formed on the clutch cover 28. At this state, the cone spring 52 is axially elastically flexed and therefore axially urges the pressure plate 51 toward the transmission side. Furthermore, the inner peripheral surface of the cone spring 52 is supported and radially positioned by an outer peripheral surface of a cylindrical section formed on the clutch cover 28. The urging member is not limited to the cone spring, and any type of urging member can be used instead of the cone spring.

A damper mechanism 24 is a mechanism for elastically connecting the clutch cover assembly 8 to the crankshaft 2 in a rotational direction. The damper mechanism 24 includes a drive member 29, the inner peripheral side section 33 of the clutch cover 28 and a plurality of elastic members 30.

The drive member 29 is an annular plate member and is secured to the distal end of the crankshaft 2 with the bolts 15. The drive plate 29 has an annular section, which engages the axial transmission side of the inner peripheral end of the disk-shaped member 12, and a plurality of engaging sections 46, which axially extend from the outer peripheral edge of the annular section on the transmission side.

The clutch cover 28 has a plurality of circumferentially extending spring retainer sections 36 formed at the inner peripheral side section 33 of the clutch cover 28. The spring retainer sections 36 are drawn to protrude axially on the transmission side relative to the rest of the inner peripheral side section 33 of the clutch cover 28 and therefore are axially concaved on the engine side. A concaved section 41 with a smaller radial dimension in comparison to that of the spring retainer section 36 is arranged circumferentially between each pair of spring retainer sections 36.

Each elastic member 30 is a circumferentially elongated coil spring received in the corresponding spring retainer section 36. At opposing circumferential ends of each elastic member 30, spring seats 43 are provided to support the circumferential ends of the elastic member 30 and engage corresponding supporting surfaces 42 formed at radially opposing sides of each concaved section 41. Each spring seat 43 includes a supporting section for supporting the corresponding elastic member 30 and a protrusion protruding from the supporting section into the interior of the coil of the elastic member 30. Each engaging section 46 of the drive member 29 is received within the corresponding concaved section 41, and the opposing circumferential ends of the engaging section 46 engage or are positioned adjacent to the corresponding rear surfaces of the supporting sections of the spring seats 43. With this arrangement, the torque of the drive member 29 can be transmitted to the clutch cover 28 through the elastic members 30. At the outer peripheral side of the spring retainer sections 36, an arc shaped or annular shaped retainer plate 48 is secured with a plurality of rivets 49. At radially outward of the elastic members 30, the retainer plate 48 supports the axial engine sides of the elastic members 30. Therefore, the elastic members 30 are held by the clutch cover 28 and are prevented from falling off in an axial direction. The engaging sections 46 of the drive member 29 can be engaged with or disengaged from the elastic members 30 only by the axial movement. The elastic member is not limited to the coil springs and can be, for example, a bent plate spring that is formed by bending a plate-like member to form a plurality of spring elements.

As described above, the inner peripheral side section 33 of the clutch cover 28 constitutes the output member of the damper mechanism 24, and the outer peripheral side section 32 of the clutch cover 28 constitutes the spring support section of the clutch cover assembly 8. By providing more than one function to such member, the number of required parts can be advantageously minimized. Furthermore, the pressure plate 51 and the cone spring 52 are received in the concaved section of the outer peripheral side section 32 axially facing the transmission side, and the elastic members 30, the drive member 29 and heads of the bolts 15 are received in the concaved section of the inner peripheral side section 32 axially facing the engine side, so that the entire arrangement is relatively compact in both the axial and radial directions. It is especially advantageous to arrange the elastic members 30 on the inner peripheral side of the pressure plate 51. By way of example, if the elastic members 30 of the damper mechanism 24 are axially disposed on the engine side of the pressure plate 51, an axial dimension of the entire apparatus is disadvantageously increased, and if the elastic members 30 of the damper mechanism 24 are arranged radially outward of the pressure plate 51, a radial dimension of the entire apparatus is disadvantageously increased.

Furthermore, the annular member 13 is arranged radially outward of the outer peripheral side section 32 of the clutch cover 28, so that a sufficient moment of inertia is ensured without increasing the axial and radial dimensions of the clutch apparatus 1.

As described above, the clutch cover assembly 8 is directly connected to the crankshaft 2 via the damper mechanism 24. As a result, the structure of the damper mechanism 24 is made to be relatively simple and compact, and therefore efficiency of assembly is advantageously improved.

The release mechanism 10 will now be described. The release mechanism 10 basically includes a cover assembly 54 and a drive mechanism 55. The cover assembly 54 is attached to the axial transmission side of the friction drive plate 23. That is, the cover assembly 54 is disposed on the opposite side of the friction drive plate 23 relative to the clutch cover assembly 8. The cover assembly 54 is a mechanism for disengaging the engaged clutch by applying a load from the drive mechanism 55, which will be described in greater detail below, to the pressure plate 51. The cover assembly 54 includes a cover member 57, a release member 58 and a lever member 59.

The cover member 57 is an annular plate member having an outer peripheral section 57a engaging the outer peripheral side surface of the friction drive plate 23, a cylindrical section 57b axially extending from an inner peripheral edge of the outer peripheral section 57a toward the transmission side, and an inner peripheral section 57c radially inwardly extending from the distal end of the cylindrical section 57b. The inner peripheral section 57c is axially spaced apart from the axial transmission side surface of the friction drive plate 23. The outer peripheral section 57a is secured to the outer peripheral section of the friction drive plate 23, for example, with bolts (not shown). On the inner peripheral section 57c, there is an annular protrusion 68 axially protruding toward the engine side.

Figure 2:
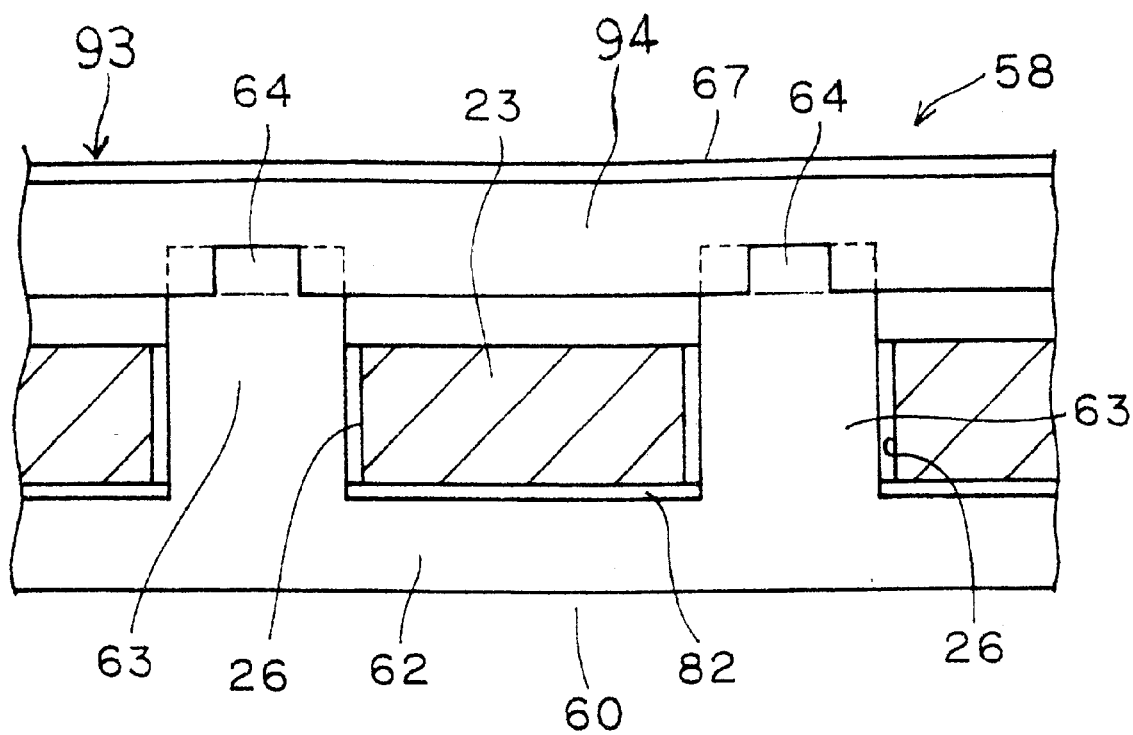
FIG. 2 is a partial top plan view illustrating the release member of the first embodiment of the present invention.
Figure 3:
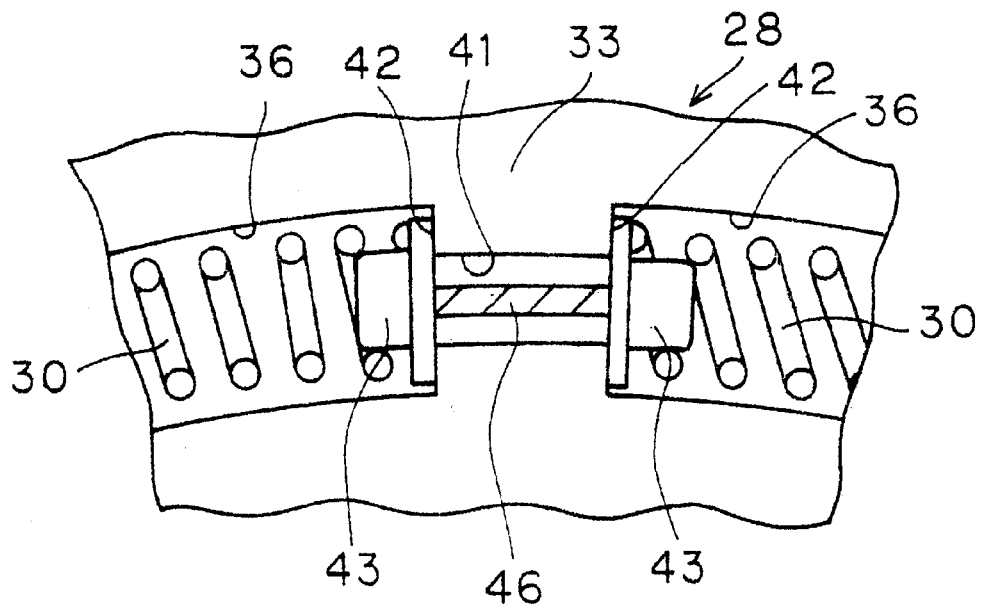
FIG. 3 is a partial side view illustrating the damper mechanism of the first embodiment of the present invention.

The release member 58 includes an axially extending drive member 60 and a support section constituting member 61. As shown in FIG. 2, the drive member 60 is a generally cylindrical member having an annular seat section 62 and a plurality of axially extending sections 63 axially extending from the seat section 62 toward the transmission side. The axial end of the seat section 62 on the engine side engages a groove 51c formed on the outer peripheral edge of the pressure plate 51 on the transmission side. The inner peripheral surface of the end of the seat section 62 is radially positioned by engagement with the outer peripheral surface of the groove 51c. With this annular seat section 62, the position of the drive member 60 relative to the pressure plate 51 is secured. Axially extending sections 63 extend through the corresponding axial through holes 26 of the friction drive plate 23 beyond the axial transmission side surface of the friction drive plate 23, as shown in FIGS. 1 and 2. The distal ends of the axially extending sections 63 are bent radially inwardly and further bent axially to form bent sections 64.

The support section constituting member 61 constitutes an annular support section for the drive member 60 and can be easily attached to and detached from the drive member 60 on the axial transmission side of the drive member 60. Furthermore, the support section constituting member 61 is a generally annular plate member and includes a disk-shaped section 93 and a cylindrical section 94 axially extending from the outer peripheral end of the disk-shaped section 93 on the transmission side. An annular protrusion 67 protruding axially on the transmission side is formed on the disk-shaped section 93. The annular protrusion 67 is positioned radially outward of the annular protrusion 68. The distal end of the cylindrical section 94 engages the outer peripheral sides of the bent sections 64. Furthermore, at the cylindrical section 94, there are flexed sections 66 that are cut and flexed so as to engage the corresponding inner peripheral sides of the bent sections 64. Each flexed section 66 is centered circumferentially on the corresponding bent section 64. With this arrangement, each bent section 64 is held radially between the cylindrical section 94 and the corresponding flexed section 66, and the support section constituting member 61 axially and radially immovably engages the distal end of each axially extending section 63.

The lever member 59 is an annular disk-shaped plate member. The outer peripheral section of the lever member 59 is axially disposed adjacent to the engine side of the inner peripheral section 57c of the cover member 57. The outer peripheral end of the lever member 59 axially engages the annular protrusion 67 of the support section constituting member 61 from the transmission side, and a radially further inwardly located section of the lever member 59 axially engages the annular protrusion 68 of the cover member 57 from the engine side. By way of example, the lever member 59 can be a disk-shaped plate having slits alternatively extending from its inner and outer peripheral edges so as to provide levers with no substantial elasticity. With the described arrangement, if the inner peripheral end of the lever member 59 axially moves toward the transmission side, the outer peripheral end of the lever member 59 axially pivots toward the engine side while the annular protrusion 68 of the cover member 57 acts as a fulcrum for the lever member 59, so that the release member 58 is moved axially toward the engine side. As a result, the pressure plate 51 overcomes the urging force of the cone spring 52 and moves away from the clutch disk 82.

The drive mechanism 55 is a mechanism for releasing the clutch by actuating the lever member 59. The drive mechanism 55 basically includes a release bearing 69, a hydraulic cylinder 70 and a hydraulic circuit 71. The release bearing 69 basically includes inner and outer races and a plurality of rolling elements disposed therebetween and can support both the radial and thrust loads. A cylindrical member 72 is attached to the outer race of the release bearing 69. The cylindrical member 72 includes a cylindrical section 73 engaging the outer peripheral surface of the outer race, a first flange 74 radially outwardly extending from the axial engine side of the cylindrical section 73, and a second flange 75 radially inwardly extending from the axial transmission side of the cylindrical section 73 and engaging the axial transmission side surface of the outer race. The first flange 74 engages the axial engine side of the inner peripheral end of the lever member 59.

The hydraulic cylinder 70 basically includes a hydraulic chamber constituting member 76 and a piston 77. A hydraulic chamber 79 is defined between the hydraulic chamber constituting member 76 and the piston 77 arranged radially inward of the hydraulic chamber constituting member 76. The hydraulic pressure can be supplied to the hydraulic chamber 79 from the hydraulic circuit 71. The piston 77 is a cylindrical member with its inner peripheral surface being supported by the outer peripheral surface of a cylindrical shaft 80 extending from the transmission side. The piston 77 includes a flange 78 engaging the axial engine side of the inner race of the release bearing 69. At this state, if the hydraulic pressure is supplied to the hydraulic chamber 79 from the hydraulic circuit 71, the piston 77 axially moves toward the transmission side so as to move the release bearing 69.

Figure 4:
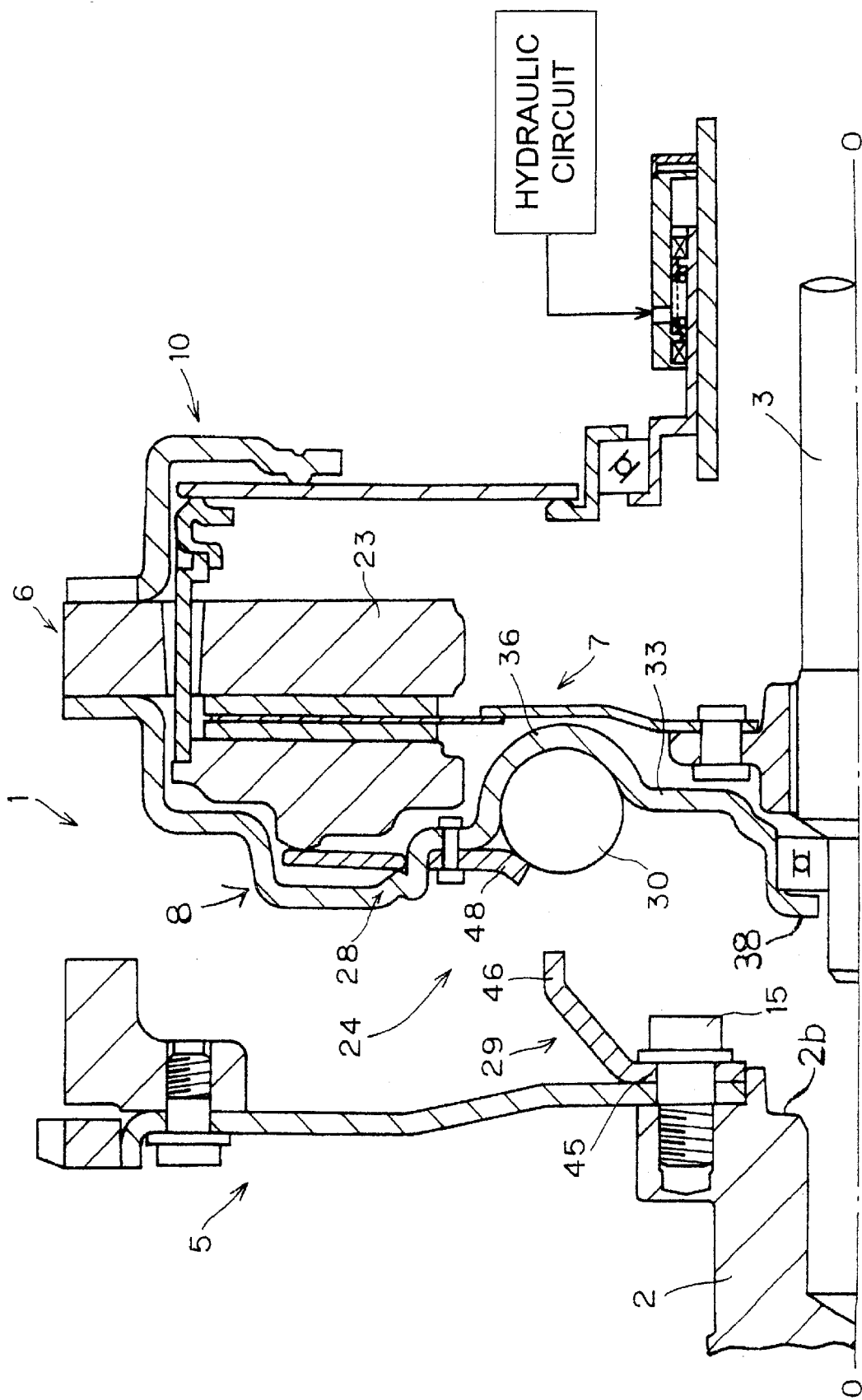
FIG. 4 is an exploded schematic longitudinal cross-sectional view of the clutch apparatus and the flywheel illustrated in FIG. 1 in accordance with a first embodiment of the present invention and illustrating the assembly operation of the clutch apparatus and the flywheel.

Assembly operation of the clutch apparatus 1 will now be described. With regard to the engine side construction, the mass body 5 and the drive member 29 are already secured to the distal end of the crankshaft 2 with the bolts 15, as shown in FIG. 4. Furthermore, the elastic members 30 are already mounted on the clutch cover 28. It means that the elastic members 30, which are the main constituting components of the damper mechanism 24, are already mounted on the component of the clutch cover assembly 8, i.e., the clutch cover 28 prior to the assembly operation. Therefore, transportation and storage of the clutch cover assembly 8 and the elastic members 30 prior to the assembly operation are eased.

From this state, for example, the engine and the crankshaft are axially moved toward the transmission side. With this movement, each engaging section 46 of the drive member 29 is axially inserted between a corresponding pair of the elastic members 30, more particularly, between a corresponding pair of the spring seats 43 from the transmission side. When the axial end surface 2b of the crankshaft 2 abuts the flange 38 of the clutch cover 28, the axial relative movement of the crankshaft 2 and the flange 38 is stopped. As described above, the assembly operation of the crankshaft 2 and the clutch cover assembly 8 is accomplished only by axially moving the crankshaft 2 and the clutch cover assembly 8 toward each other without requiring any fastening elements, such as bolts, rivets or the like. Therefore, the assembly operation of the clutch apparatus 1 according to the present invention is simplified and can be accomplished within a short period of time. In summary, the assembly of the clutch apparatus 1 is advantageously eased.

As described above, in the clutch apparatus of the present invention, the damper mechanism can be assembled by axially moving the crankshaft and the flywheel toward each other. That is, the assembly is eased in comparison to the prior art.

Second Embodiment

Referring now to FIGS. 5–8, a clutch apparatus 200 in accordance with the second embodiment of the present invention will now be discussed. In view of the similarities between this second embodiment and the first embodiment, discussed above, the components or parts of this second embodiment having the same function of the corresponding components or parts of the first embodiment are being given the identical reference numerals. Moreover, the explanations of components or parts and the operations of this second embodiment that are similar to components or parts and the operations of the first embodiment will be omitted. Only components and operations of this second embodiment that are different in structure and function from the first embodiment will be explained herein.

Figure 5:
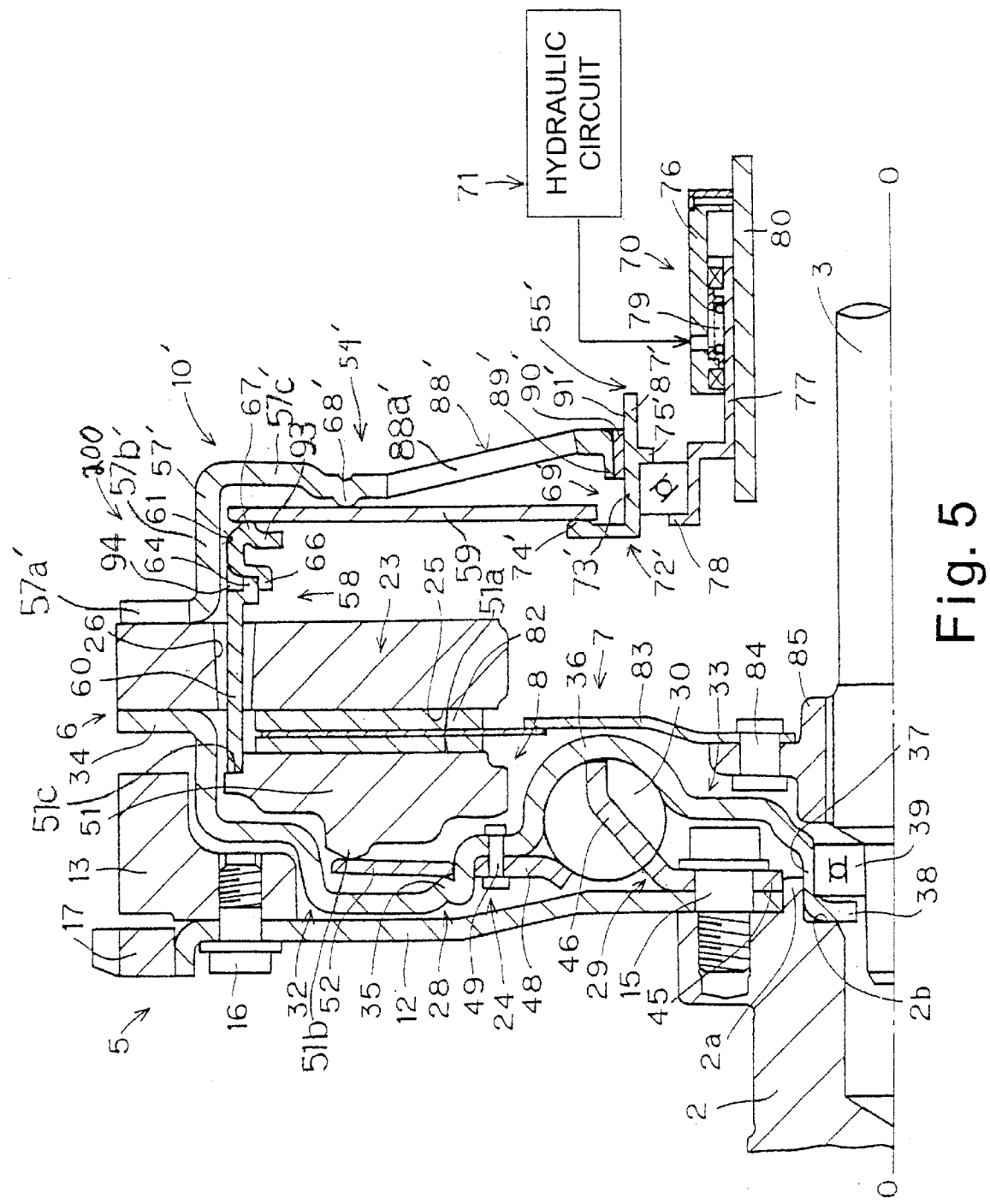
FIG. 5 is a schematic longitudinal cross-sectional view of a clutch apparatus and a flywheel coupled together in accordance with a second embodiment of the present invention.

With reference to FIG. 5, there is shown a longitudinal cross sectional view of a clutch apparatus 200 according to the second embodiment of the present invention. The clutch apparatus 200 is an apparatus for enabling and disabling transmission of torque from a crankshaft 2 of an engine to an input shaft 3 of a transmission. The engine (not shown) is disposed on the left side of FIG. 5, and the transmission (not shown) is disposed on the right side of FIG. 5. The clutch apparatus 200 basically includes a mass body 5, a clutch disk assembly 7, a clutch cover assembly 8 and a release mechanism 10'.

The mass body 5 is secured to a distal end of the crankshaft 2. The mass body 5 is a member for ensuring presence of a large moment of inertia on the crankshaft 2. The mass body 5 includes a disk-shaped member 12 and an annular member 13. The disk-shaped member 12 is secured at its inner peripheral end to the distal end of the crankshaft 2 with a plurality of bolts 15. The bolts 15 are axially threadedly inserted from the transmission side. The inner peripheral edge of the disk-shaped member 12 engages an outer peripheral surface of an annular protrusion 2a formed on the distal end surface of the crankshaft 2. The annular member 13 is secured to the axial transmission side of the outer peripheral end of the disk-shaped member 12. The annular member 13 is an inertia member having a relatively large axial thickness. The annular member 13 is secured to the disk-shaped member 12 with a plurality of circumferentially arranged bolts 16. The bolts 16 are axially threadedly inserted from the engine side. A ring gear 17 is provided for starting the engine. The ring gear 17 is secured to the outer peripheral edge of the disk-shaped member 12. The entire mass body can be formed as an integral member.

The friction drive plate 23 is a disk-shaped annular member that is axially disposed on the transmission side of the mass body 5 and is spaced apart from the mass body 5. An outer diameter of the friction drive plate 23 is substantially equal to that of the annular member 13. However, an inner diameter of the friction drive plate 23 is smaller than that of the annular member 13 but greater than that of the disk-shaped member 12. The friction drive plate 23 has an annular flat friction surface 25 on the axial engine side thereof. The friction drive plate 23 has a plurality of axially extending through holes 26 circumferentially arranged on the friction drive plate 23. The holes 26 are located in a section radially outward of the friction surface 25.

The clutch disk assembly 7 basically includes a clutch disk 82, a connecting plate 83 and a hub 85. The clutch disk 82 includes a plate and a pair of friction facings provided on the opposing sides of the plate, respectively. The clutch disk 82 is placed adjacent to the friction surface 25 of the friction drive plate 23. The connecting plate 83 is an annular disk-shaped plate member and is disposed adjacent to an axial transmission side of an inner peripheral side section 33 of the clutch cover 28, which will be described in greater detail below. An outer peripheral section of the connecting plate 83 is secured to the plate of the clutch disk 82, for example, with rivets (not shown). Furthermore, an inner peripheral section of the connecting plate 83 is secured to the hub 85 with a plurality of rivets 84. At the inner peripheral surface of the hub 85, there is a spline hole for engaging with the input shaft 3.

The clutch cover assembly 8 will now be described. The clutch cover assembly 8 basically includes an outer peripheral section 32 of the clutch cover 28 attached to the axial engine side of the friction drive plate 23, a pressure plate 51 and a cone spring 52.

The clutch cover (plate member) 28 is a disk-shaped annular plate member that is axially disposed adjacent to the transmission side of the mass body 5. An outer diameter of the clutch cover 28 is substantially equal to that of the annular member 13 while an inner diameter of the clutch cover 28 is smaller than that of the disk-shaped member 12. The clutch cover 28 is divided into the outer and inner peripheral side sections 32, 33 at its radially midpoint. The outer peripheral side section 32 is generally axially convexed toward the engine side, providing an axial space between the outer peripheral side section 32 and the friction drive plate 23. The inner peripheral side section 33 is axially convexed toward the transmission side, providing an axial space between the inner peripheral side section 33 and the disk-shaped member 12. The outermost peripheral edge portion 34 of the outer peripheral side section 32 is secured to the outer peripheral section of the friction drive plate 23, for example, with bolts (not shown). The inner peripheral end of the inner peripheral side section 33 includes a cylindrical section 37 and a flange 38 radially inwardly extending from the inner end of the cylindrical section 37. The outer peripheral surface of the cylindrical section 37 engages the inner peripheral surface of the annular protrusion 2a, and the flange 38 engages the axial distal end surface 2b of the crankshaft 2 that is arranged radially inward of the annular protrusion 2a on the transmission side. With this construction, the inner peripheral end of the clutch cover 28 is axially and radially positioned relative to the crankshaft 2. Furthermore, a bearing 39 is arranged between the cylindrical section 37 and the input shaft 3. The bearing 39 is a radial bearing that includes inner and outer races and a plurality of rolling elements and rotatably supports the input shaft 3 relative to the clutch cover 28.

The pressure plate 51 is an annular member axially disposed on the axial engine side of the clutch disk 82. The pressure plate 51 has an annular flat pressing surface 51a facing the clutch disk 82.

The cone spring 52 (urging member) is axially positioned between the outer peripheral section 32 and the pressure plate 51. The outer peripheral end of the cone spring 52 is supported by the annular protrusion 51b of the pressure plate 51, and the inner peripheral end of the cone spring 52 is supported by an annular protrusion 35 formed on the clutch cover 28. At this state, the cone spring 52 is axially elastically flexed and therefore axially urges the pressure plate 51 toward the transmission side. Furthermore, the inner peripheral surface of the cone spring 52 is supported and radially positioned by an outer peripheral surface of a cylindrical section formed on the clutch cover 28. The urging member is not limited to the cone spring, and any type of urging member can be used instead of the cone spring.

A damper mechanism 24 is a mechanism for elastically connecting the clutch cover assembly 8 to the crankshaft 2 in a rotational direction. The damper mechanism 24 includes a drive member 29, the inner peripheral side section 33 of the clutch cover 28 and a plurality of elastic members 30.

The drive member 29 is an annular plate member and is secured to the distal end of the crankshaft 2 with the bolts 15. The drive plate 29 has an annular section, which engages the axial transmission side of the inner peripheral end of the disk-shaped member 12, and a plurality of engaging sections 46, which axially extend from the outer peripheral edge of the annular section on the transmission side.

The clutch cover 28 has a plurality of circumferentially extending spring retainer sections 36 formed at the inner peripheral side section 33 of the clutch cover 28. The spring retainer sections 36 are drawn to protrude axially on the transmission side relative to the rest of the inner peripheral side section 33 of the clutch cover 28 and therefore are axially concaved on the engine side. A concaved section 41 with a smaller radial dimension in comparison to that of the spring retainer section 36 is arranged circumferentially between each pair of spring retainer sections 36.

Each elastic member 30 is a circumferentially elongated coil spring received in the corresponding spring retainer section 36. At opposing circumferential ends of each elastic member 30, spring seats 43 are provided to support the circumferential ends of the elastic member 30 and engage corresponding supporting surfaces 42 formed at radially opposing sides of each concaved section 41. Each spring seat 43 includes a supporting section for supporting the corresponding elastic member 30 and a protrusion protruding from the supporting section into the interior of the coil of the elastic member 30. Each engaging section 46 of the drive member 29 is received within the corresponding concaved section 41, and the opposing circumferential ends of the engaging section 46 engage or are positioned adjacent to the corresponding rear surfaces of the supporting sections of the spring seats 43. With this arrangement, the torque of the drive member 29 can be transmitted to the clutch cover 28 through the elastic members 30. At the outer peripheral side of the spring retainer sections 36, an arc shaped or annular shaped retainer plate 48 is secured with a plurality of rivets 49. At radially outward of the elastic members 30, the retainer plate 48 supports the axial engine sides of the elastic members 30. Therefore, the elastic members 30 are held by the clutch cover 28 and are prevented from falling off in an axial direction. The engaging sections 46 of the drive member 29 can be engaged with or disengaged from the elastic members 30 only by the axial movement. The elastic member is not limited to the coil springs and can be, for example, a bent plate spring that is formed by bending a plate-like member to form a plurality of spring elements.

As described above, the inner peripheral side section 33 of the clutch cover 28 constitutes the output member of the damper mechanism 24, and the outer peripheral side section 32 of the clutch cover 28 constitutes the spring support section of the clutch cover assembly 8. By providing more than one function to such member, the number of required parts can be advantageously minimized. Furthermore, the pressure plate 51 and the cone spring 52 are received in the concaved section of the outer peripheral side section 32 axially facing the transmission side, and the elastic members 30, the drive member 29 and heads of the bolts 15 are received in the concaved section of the inner peripheral side section 32 axially facing the engine side, so that the entire arrangement is relatively compact in both the axial and radial directions. It is especially advantageous to arrange the elastic members 30 on the inner peripheral side of the pressure plate 51. By way of example, if the elastic members 30 of the damper mechanism 24 are axially disposed on the engine side of the pressure plate 51, an axial dimension of the entire apparatus is disadvantageously increased, and if the elastic members 30 of the damper mechanism 24 are arranged radially outward of the pressure plate 51, a radial dimension of the entire apparatus is disadvantageously increased.

Furthermore, the annular member 13 is arranged radially outward of the outer peripheral side section 32 of the clutch cover 28, so that a sufficient moment of inertia is ensured without increasing the axial and radial dimensions of the clutch apparatus 200.

As described above, the clutch cover assembly 8 is directly connected to the crankshaft 2 via the damper mechanism 24. As a result, the structure of the damper mechanism 24 is made to be relatively simple and compact, and therefore efficiency of assembly is advantageously improved.

The release mechanism 10' will now be described. The release mechanism 10' basically includes a cover assembly 54' and a drive mechanism 55'. The cover assembly 54' is attached to the axial transmission side of the friction drive plate 23. That is, the cover assembly 54' is disposed on the opposite side of the friction drive plate 23 relative to the clutch cover assembly 8. The cover assembly 54' is a mechanism for disengaging the engaged clutch by applying a load from the drive mechanism 55', which will be described in greater detail below, to the pressure plate 51. The cover assembly 54' includes a cover member 57', a release member 58' and a lever member 59.

The cover member 57' is an annular plate member having an outer peripheral section 57a' engaging the outer peripheral side surface of the friction drive plate 23, a cylindrical section 57b' axially extending from an inner peripheral edge of the outer peripheral section 57a' toward the transmission side, and an inner peripheral section 57c' radially inwardly extending from the distal end of the cylindrical section 57b'. The inner peripheral section 57c' is axially spaced apart from the axial transmission side surface of the friction drive plate 23. The outer peripheral section 57a' is secured to the outer peripheral section of the friction drive plate 23, for example, with bolts (not shown). On the inner peripheral section 57c', there is an annular protrusion 68' axially protruding toward the engine side.

Figure 6:
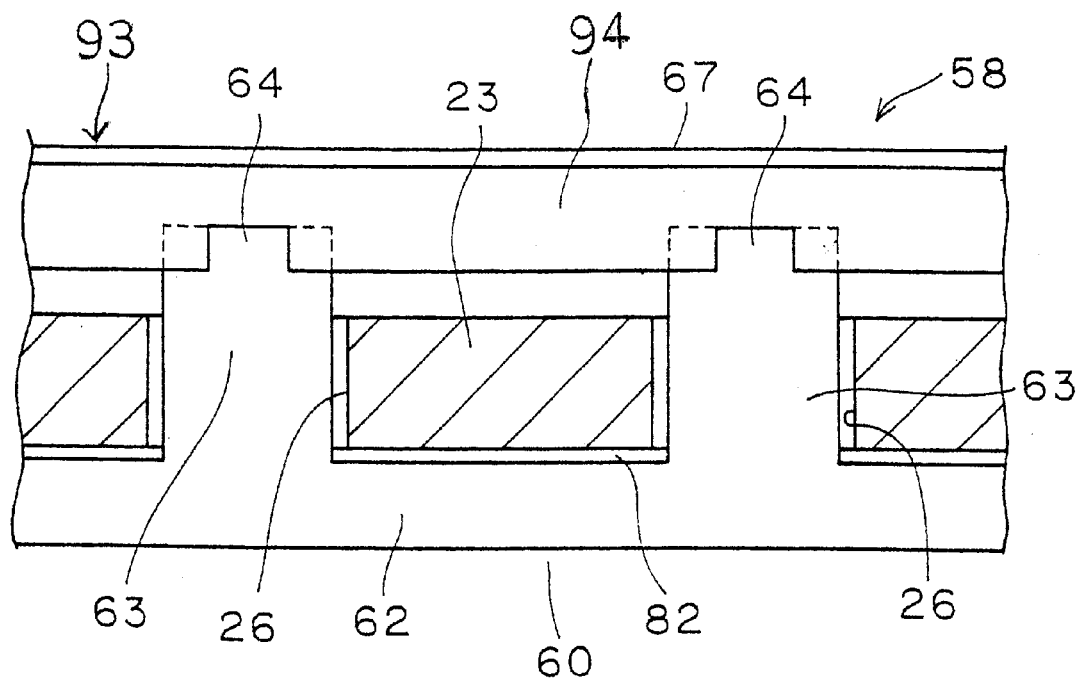
FIG. 6 is a partial top plan view illustrating the release member of the second embodiment of the present invention.
Figure 7:
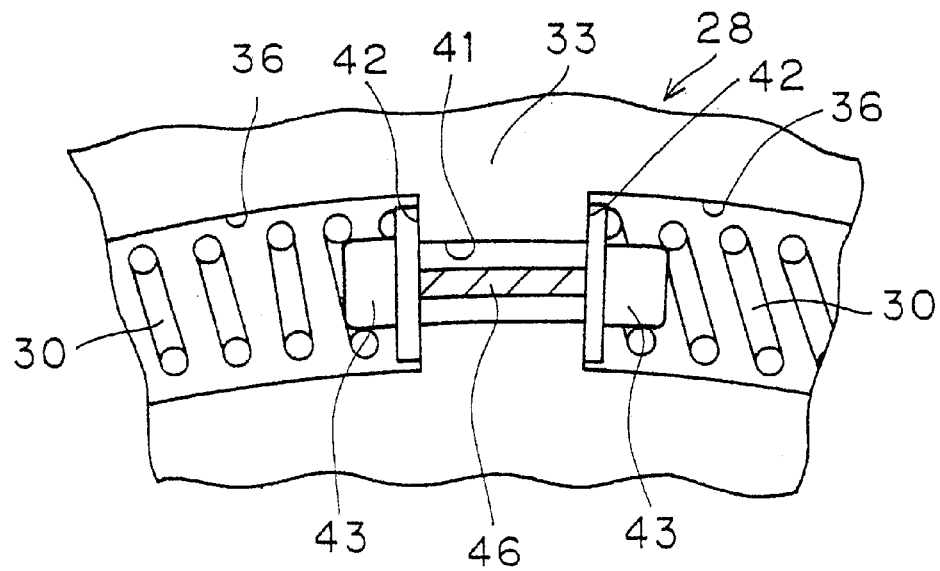
FIG. 7 is a partial side view illustrating the damper mechanism of the second embodiment of the present invention.

The release member 58' includes an axially extending drive member 60 and a support section constituting member 61. As shown in FIG. 6, the drive member 60 is a generally cylindrical member having an annular seat section 62 and a plurality of axially extending sections 63 axially extending from the seat section 62 toward the transmission side. The axial end of the seat section 62 on the engine side engages a groove 51c formed on the outer peripheral edge of the pressure plate 51 on the transmission side. The inner peripheral surface of the end of the seat section 62 is radially positioned by engagement with the outer peripheral surface of the groove 51c. With this annular seat section 62, the position of the drive member 60 relative to the pressure plate 51 is secured. Axially extending sections 63 extend through the corresponding axial through holes 26 of the friction drive plate 23 beyond the axial transmission side surface of the friction drive plate 23, as shown in FIGS. 5 and 6. The distal ends of the axially extending sections 63 are bent radially inwardly and further bent axially to form bent sections 64.

The support section constituting member 61 constitutes an annular support section for the drive member 60 and can be easily attached to and detached from the drive member 60 on the axial transmission side of the drive member 60. Furthermore, the support section constituting member 61 is a generally annular plate member and includes a disk-shaped section 93 and a cylindrical section 94 axially extending from the outer peripheral end of the disk-shaped section 93 on the transmission side. An annular protrusion 67 protruding axially on the transmission side is formed on the disk-shaped section 93. The annular protrusion 67 is positioned radially outward of the annular protrusion 68. The distal end of the cylindrical section 94 engages the outer peripheral sides of the bent sections 64. Furthermore, at the cylindrical section 94, there are flexed sections 66 that are cut and flexed so as to engage the corresponding inner peripheral sides of the bent sections 64. Each flexed section 66 is centered circumferentially on the corresponding bent section 64. With this arrangement, each bent section 64 is held radially between the cylindrical section 94 and the corresponding flexed section 66, and the support section constituting member 61 axially and radially immovably engages the distal end of each axially extending section 63.

The lever member 59 is an annular disk-shaped plate member. The outer peripheral section of the lever member 59 is axially disposed adjacent to the engine side of the inner peripheral section 57c' of the cover member 57'. The outer peripheral end of the lever member 59 axially engages the annular protrusion 67 of the support section constituting member 61 from the transmission side, and a radially further inwardly located section of the lever member 59 axially engages the annular protrusion 68' of the cover member 57' from the engine side. By way of example, the lever member 59 can be a disk-shaped plate having slits alternatively extending from its inner and outer peripheral edges so as to provide levers with no substantial elasticity. With the described arrangement, if the inner peripheral end of the lever member 59 axially moves toward the transmission side, the outer peripheral end of the lever member 59 axially pivots toward the engine side while the annular protrusion 68' of the cover member 57' acts as a fulcrum for the lever member 59, so that the release member 58 is moved axially toward the engine side. As a result, the pressure plate 51 overcomes the urging force of the cone spring 52 and moves away from the clutch disk 82.

The drive mechanism 55' is a mechanism for releasing the clutch by actuating the lever member 59. The drive mechanism 55' basically includes a release bearing 69', a hydraulic cylinder 70 and a hydraulic circuit 71. The release bearing 69' basically includes inner and outer races and a plurality of rolling elements disposed therebetween and can support both the radial and thrust loads. A cylindrical member 72' is attached to the outer race of the release bearing 69'. The cylindrical member 72' includes a cylindrical section 73' engaging the outer peripheral surface of the outer race, a first flange 74' radially outwardly extending from the axial engine side of the cylindrical section 73', and a second flange 75' radially inwardly extending from the axial transmission side of the cylindrical section 73' and engaging the axial transmission side surface of the outer race. The first flange 74' engages the axial engine side of the inner peripheral end of the lever member 59.

The hydraulic cylinder 70 basically includes a hydraulic chamber constituting member 76 and a piston 77. A hydraulic chamber 79 is defined between the hydraulic chamber constituting member 76 and the piston 77 arranged radially inward of the hydraulic chamber constituting member 76. The hydraulic pressure can be supplied to the hydraulic chamber 79 from the hydraulic circuit 71. The piston 77 is a cylindrical member with its inner peripheral surface being supported by the outer peripheral surface of a cylindrical shaft 80 extending from the transmission side. The piston 77 includes a flange 78 engaging the axial engine side of the inner race of the release bearing 69'. At this state, if the hydraulic fluid is drained out from the hydraulic chamber 79 through the hydraulic circuit 71, the piston 77 axially moves toward the transmission side so as to move the release bearing 69'.

A support structure for the cover member 57' will now be described. On the cylindrical section 73' of the cylindrical member 72', an extension 87' axially extending on the transmission side is further provided. With this arrangement, the axially elongated outer peripheral surface 91' is formed on the cylindrical member 72'.

The inner peripheral section 57c' of the cover member 57' extends further radially inwardly in comparison to the above embodiment and forms an inner peripheral side extension 88'. With this arrangement, an inner diameter of the inner peripheral section 57c' is substantially equal to that of the lever member 59, and therefore the inner peripheral end of the inner peripheral section 57c' is located adjacent to the release bearing 69'. The inner peripheral side extension 88' has a plurality of holes 88a' formed therein. At the inner peripheral edge of the inner peripheral side extension 88', a cylindrical section 89' axially extending on the engine side is provided. A cylindrical member 90' is secured to the inner peripheral side of the cylindrical section 89'. The inner peripheral surface of the cylindrical member 90' is supported by the outer peripheral surface 91' of the extension 87'. In the described arrangement consisting of the clutch cover assembly 8, the friction drive plate 23 and the cover assembly 54', the cover member 57' is the axially outermost member on the transmission side and is supported by the other member disposed on the transmission side. Therefore, the entire clutch apparatus 200 is not readily tilted by the bending vibrations transmitted from the engine and therefore can suppress the vibrational resonances induced by the bending vibrations of the engine. As a result, it is possible to reduce the thickness of the clutch cover 28.

Also, in the described arrangement consisting of the clutch cover assembly 8, the friction drive plate 23 and the cover assembly 54', the clutch cover 28 is the axially outermost member on the engine side and is supported by the crankshaft 2 at its inner peripheral end, resulting in the clutch apparatus 200 being advantageously supported on both axial sides. Therefore, the vibrational resonances induced by the bending vibrations transmitted from the engine is further suppressed.

Since the release bearing 69 is used as a support member for the inner peripheral end of the cover member 57', a specialized support component and a space for accommodating it are not required. In other words, the cylindrical member 72' includes the first flange 74' for actuating the lever member 59 as well as the extension 87' for supporting the cover member 57'. Furthermore, since the axially elongated cylindrical member 90' is used at the inner peripheral side extension 88', the relatively long axial engagement between the inner peripheral surface of the cover member 57' and the corresponding member can be accomplished, so that the cover member 57' can further resist the tilting. A material with a low coefficient of friction can be used for the cylindrical member 90' to reduce the sliding resistance between the engaging sections as the release bearing 69' moves axially.

Figure 8:
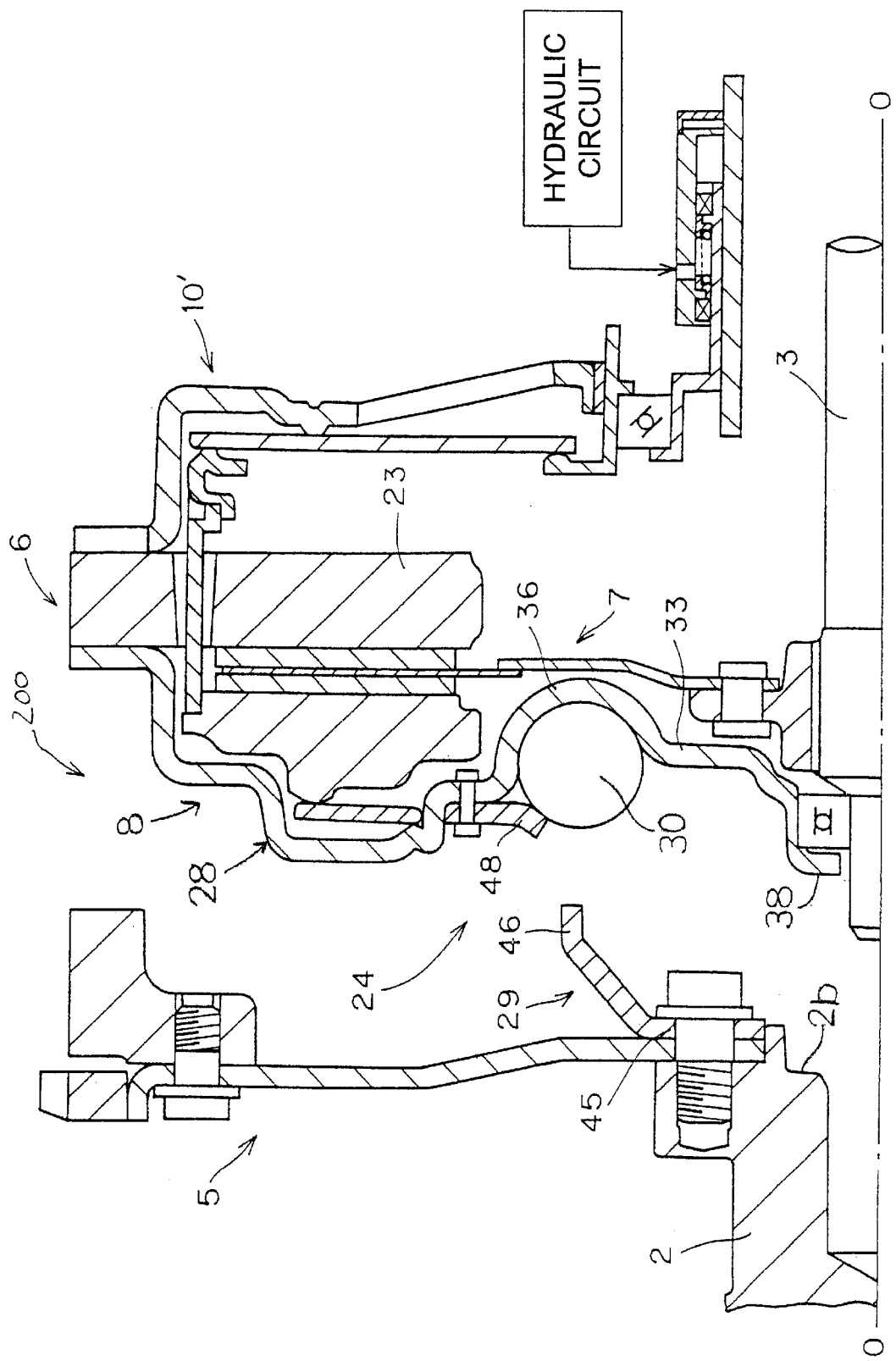
FIG. 8 is an exploded schematic longitudinal cross-sectional view of the clutch apparatus and the flywheel illustrated in FIG. 5 in accordance with a second embodiment of the present invention and illustrating the assembly operation of the clutch apparatus and the flywheel.

Assembly operation of the clutch apparatus 200 will now be described. With regard to the engine side construction, the mass body 5 and the drive member 29 are already secured to the distal end of the crankshaft 2 with the bolts 15, as shown in FIG. 8. Furthermore, the elastic members 30 are already mounted on the clutch cover 28. It means that the elastic members 30, which are the main constituting components of the damper mechanism 24, are already mounted on the component of the clutch cover assembly 8, i.e., the clutch cover 28 prior to the assembly operation. Therefore, transportation and storage of the clutch cover assembly 8 and the elastic members 30 prior to the assembly operation are eased.

From this state, for example, the engine and the crankshaft are axially moved toward the transmission side. With this movement, each engaging section 46 of the drive member 29 is axially inserted between a corresponding pair of the elastic members 30, more particularly, between a corresponding pair of the spring seats 43 from the transmission side. When the axial end surface 2b of the crankshaft 2 abuts the flange 38 of the clutch cover 28, the axial relative movement of the crankshaft 2 and the flange 38 is stopped. As described above, the assembly operation of the crankshaft 2 and the clutch cover assembly 8 is accomplished only by axially moving the crankshaft 2 and the clutch cover assembly 8 toward each other without requiring any fastening elements, such as bolts, rivets or the like. Therefore, the assembly operation of the clutch apparatus 200 according to the present invention is simplified and can be accomplished within a short period of time. In summary, the assembly of the clutch apparatus 200 is advantageously eased.

As described above, in the clutch apparatus of the present invention, the inner peripheral end of the cover member is supported by the member disposed on the transmission side, so that even if the bending vibrations are transmitted from the engine, the entire clutch apparatus is not readily tilted and therefore can suppress the vibrational resonances induced by the bending vibrations.

Third Embodiment

Referring now to FIGS. 9–12, a clutch apparatus 300 in accordance with the third embodiment of the present invention will now be discussed. In view of the similarities between this third embodiment and the first embodiment, discussed above, the components or parts of this third embodiment having the same function of the corresponding components or parts of the first embodiment are being given the identical reference numerals. Moreover, the explanations of components or parts and the operations of this third embodiment that are similar to components or parts and the operations of the first embodiment will be omitted. Only components and operations of this third embodiment that are different in structure and function from the first embodiment will be explained herein.

Figure 9:
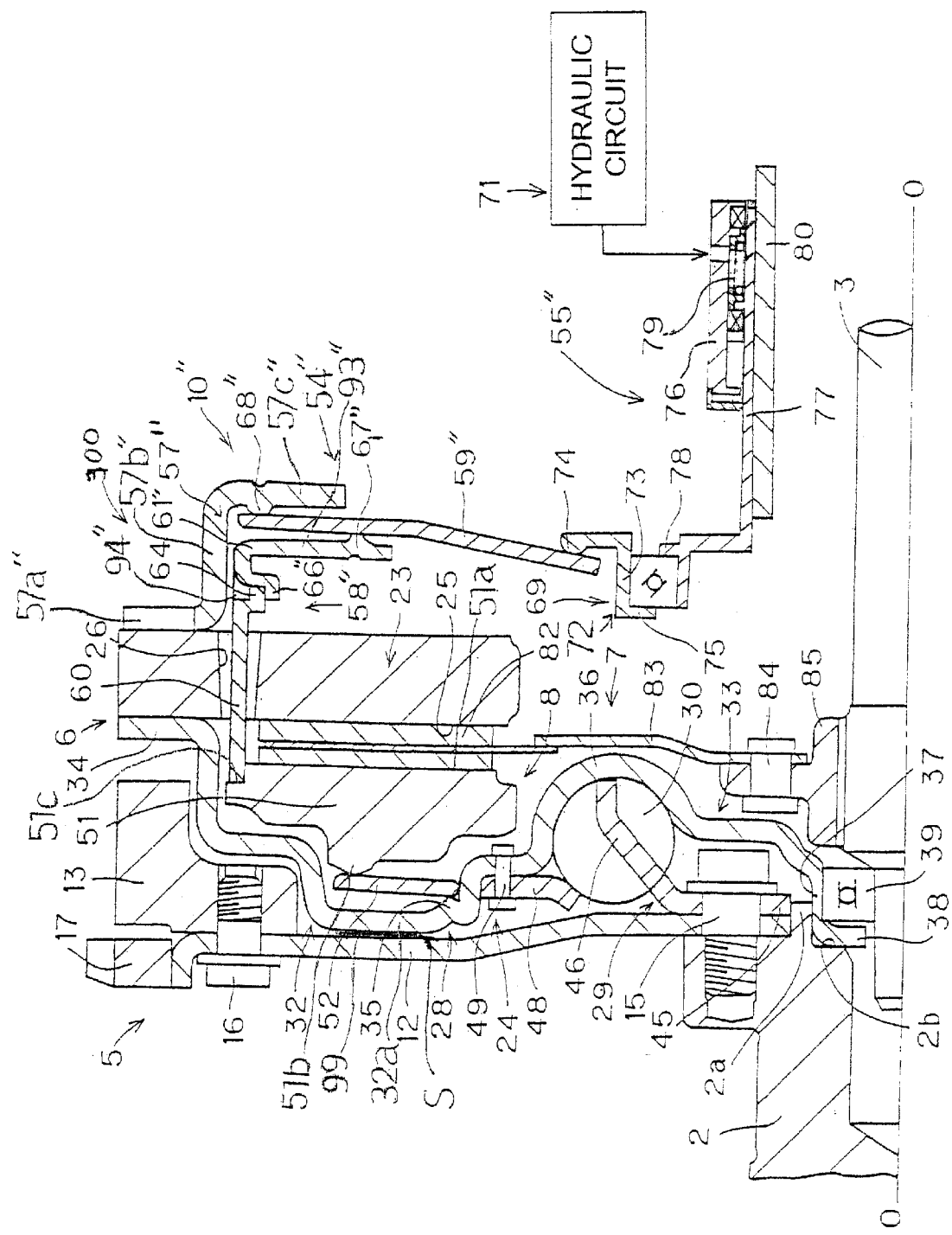
FIG. 9 is a schematic longitudinal cross-sectional view of a clutch apparatus and a flywheel coupled together in accordance with a third embodiment of the present invention.

With reference to FIG. 9, there is shown a longitudinal cross sectional view of a clutch apparatus 300 according to a first embodiment of the present invention. The clutch apparatus 300 is an apparatus for enabling and disabling transmission of torque from a crankshaft 2 of an engine to an input shaft 3 of a transmission. The engine (not shown) is disposed on the left side of FIG. 9, and the transmission (not shown) is disposed on the right side of FIG. 9. The clutch apparatus 300 basically includes a mass body 5, a clutch disk assembly 7, a clutch cover assembly 8 and a release mechanism 10".

The mass body 5 is secured to a distal end of the crankshaft 2. The mass body 5 is a member for ensuring presence of a large moment of inertia on the crankshaft 2.

The mass body 5 includes a disk-shaped member 12 and an annular member 13. The disk-shaped member 12 is secured at its inner peripheral end to the distal end of the crankshaft 2 with a plurality of bolts 15. The bolts 15 are axially threadedly inserted from the transmission side. The inner peripheral edge of the disk-shaped member 12 engages an outer peripheral surface of an annular protrusion 2a formed on the distal end surface of the crankshaft 2. The annular member 13 is secured to the axial transmission side of the outer peripheral end of the disk-shaped member 12. The annular member 13 is an inertia member having a relatively large axial thickness. The annular member 13 is secured to the disk-shaped member 12 with a plurality of circumferentially arranged bolts 16. The bolts 16 are axially threadedly inserted from the engine side. A ring gear 17 provided for starting the engine is secured to the outer peripheral edge of the disk-shaped member 12. The entire mass body can be formed as an integral member.

The friction drive plate 23 is a disk-shaped annular member that is axially disposed on the transmission side of the mass body 5 and is spaced apart from the mass body 5. An outer diameter of the friction drive plate 23 is substantially equal to that of the annular member 13. However, an inner diameter of the friction drive plate 23 is smaller than that of the annular member 13 but greater than that of the disk-shaped member 12. The friction drive plate 23 has an annular flat friction surface 25 on the axial engine side thereof. The friction drive plate 23 has a plurality of axially extending through holes 26 circumferentially arranged on the friction drive plate 23. The holes 26 are located in a section radially outward of the friction surface 25.

The clutch disk assembly 7 basically includes a clutch disk 82, a connecting late 83 and a hub 85. The clutch disk 82 includes a plate and a pair of friction facings provided on the opposing sides of the plate, respectively. The clutch disk 82 is placed adjacent to the friction surface 25 of the friction drive plate 23. The connecting plate 83 is an annular disk-shaped plate member and is disposed adjacent to an axial transmission side of an inner peripheral side section 33 of the clutch cover 28, which will be described in greater detail below. An outer peripheral section of the connecting plate 83 is secured to the plate of the clutch disk 82, for example, with rivets (not shown). Furthermore, an inner peripheral section of the connecting plate 83 is secured to the hub 85 with a plurality of rivets 84. At the inner peripheral surface of the hub 85, there is a spline hole for engaging with the input shaft 3.

The clutch cover assembly 8 will now be described. The clutch cover assembly 8 basically includes an outer peripheral section 32 of the clutch cover 28 attached to the axial engine side of the friction drive plate 23, a pressure plate 51 and a cone spring 52.

The clutch cover (plate member) 28 is a disk-shaped annular plate member that is axially disposed adjacent to the transmission side of the mass body 5. An outer diameter of the clutch cover 28 is substantially equal to that of the annular member 13 while an inner diameter of the clutch cover 28 is smaller than that of the disk-shaped member 12. The clutch cover 28 is divided into the outer and inner peripheral side sections 32, 33 at its radially midpoint. The outer peripheral side section 32 is generally axially convexed toward the engine side, providing an axial space between the outer peripheral side section 32 and the friction drive plate 23. The inner peripheral side section 33 is axially convexed toward the transmission side, providing an axial space between the inner peripheral side section 33 and the disk-shaped member 12. The outermost peripheral edge portion 34 of the outer peripheral side section 32 is secured to the outer peripheral section of the friction drive plate 23, for example, with bolts (not shown). The inner peripheral end of the inner peripheral side section 33 includes a cylindrical section 37 and a flange 38 radially inwardly extending from the inner end of the cylindrical section 37. The outer peripheral surface of the cylindrical section 37 engages the inner peripheral surface of the annular protrusion 2a, and the flange 38 engages the axial distal end surface 2b of the crankshaft 2 that is arranged radially inward of the annular protrusion 2a on the transmission side. With this construction, the inner peripheral end of the clutch cover 28 is axially and radially positioned relative to the crankshaft 2. Furthermore, a bearing 39 is arranged between the cylindrical section 37 and the input shaft 3. The bearing 39 is a radial bearing that includes inner and outer races and a plurality of rolling elements and rotatably supports the input shaft 3 relative to the clutch cover 28.

The pressure plate 51 is an annular member axially disposed on the axial engine side of the clutch disk 82. The pressure plate 51 has an annular flat pressing surface 51a facing the clutch disk 82.

The cone spring 52 (urging member) is axially positioned between the outer peripheral section 32 and the pressure plate 51. The outer peripheral end of the cone spring 52 is supported by the annular protrusion 51b of the pressure plate 51, and the inner peripheral end of the cone spring 52 is supported by an annular protrusion 35 formed on the clutch cover 28. At this state, the cone spring 52 is axially elastically flexed and therefore axially urges the pressure plate 51 toward the transmission side. Furthermore, the inner peripheral surface of the cone spring 52 is supported and radially positioned by an outer peripheral surface of a cylindrical section formed on the clutch cover 28. The urging member is not limited to the cone spring, and any type of urging member can be used instead of the cone spring.

The clutch cover 28 is an axially thin metal plate with sufficient resiliency such that it can be flexed in an axial direction towards disk-shaped member 12. A friction facing 99 is bonded to an axial engine side of a flat annular portion 32a of the outer peripheral side section 32 of the clutch cover 28. The friction facing 99 axially faces the flat surface of the disk-shaped member 12. In the engaged state of the clutch shown in FIG. 9, an axial space S is provided between the friction facing 99 and the disk-shaped member 12. In this clutch apparatus 300, when the clutch is released by applying the load to the clutch cover assembly 8 from the release mechanism 10", the relative rotation limiting mechanism connects the clutch cover assembly 8 to the member disposed on the crankshaft side, such as the crankshaft 2 itself or other member secured to the crankshaft, with aid of the load. As a result, the operation of the damper mechanism 24 is restricted when the clutch is released, so that the vibrational resonances in the low engine speed range at the engine start up or at the engine stall are suppressed. Since the locking of the damper mechanism 24 is achieved by use of the load that is applied from the release mechanism 10" when the clutch is released, the structure is relatively simple in comparison to that of the prior art. In this embodiment, the relative rotation limiting mechanism is formed of the flat annular portion 32a with the friction facing 99 (first relative rotation limiting member) of the clutch cover 28 and the flat surface of the disk-shaped member 12 (second relative rotation limiting member) that engages the friction facing 99 formed of the flat annular portion 32a.

A damper mechanism 24 is a mechanism for elastically connecting the clutch cover assembly 8 to the crankshaft 2 in a rotational direction. The damper mechanism 24 includes a drive member 29, the inner peripheral side section 33 of the clutch cover 28 and a plurality of elastic members 30.

The drive member 29 is an annular plate member and is secured to the distal end of the crankshaft 2 with the bolts 15. The drive plate 29 has an annular section, which engages the axial transmission side of the inner peripheral end of the disk-shaped member 12, and a plurality of engaging sections 46, which axially extend from the outer peripheral edge of the annular section on the transmission side.

The clutch cover 28 has a plurality of circumferentially extending spring retainer sections 36 formed at the inner peripheral side section 33 of the clutch cover 28. The spring retainer sections 36 are drawn to protrude axially on the transmission side relative to the rest of the inner peripheral side section 33 of the clutch cover 28 and therefore are axially concaved on the engine side. A concaved section 41 with a smaller radial dimension in comparison to that of the spring retainer section 36 is arranged circumferentially between each pair of spring retainer sections 36.

Each elastic member 30 is a circumferentially elongated coil spring received in the corresponding spring retainer section 36. At opposing circumferential ends of each elastic member 30, spring seats 43 are provided to support the circumferential ends of the elastic member 30 and engage corresponding supporting surfaces 42 formed at radially opposing sides of each concaved section 41. Each spring seat 43 includes a supporting section for supporting the corresponding elastic member 30 and a protrusion protruding from the supporting section into the interior of the coil of the elastic member 30. Each engaging section 46 of the drive member 29 is received within the corresponding concaved section 41, and the opposing circumferential ends of the engaging section 46 engage or are positioned adjacent to the corresponding rear surfaces of the supporting sections of the spring seats 43. With this arrangement, the torque of the drive member 29 can be transmitted to the clutch cover 28 through the elastic members 30. At the outer peripheral side of the spring retainer sections 36, an arc shaped or annular shaped retainer plate 48 is secured with a plurality of rivets 49. At radially outward of the elastic members 30, the retainer plate 48 supports the axial engine sides of the elastic members 30. Therefore, the elastic members 30 are held by the clutch cover 28 and are prevented from falling off in an axial direction. The engaging sections 46 of the drive member 29 can be engaged with or disengaged from the elastic members 30 only by the axial movement. The elastic member is not limited to the coil springs and can be, for example, a bent plate spring that is formed by bending a plate-like member to form a plurality of spring elements.

As described above, the inner peripheral side section 33 of the clutch cover 28 constitutes the output member of the damper mechanism 24, and the outer peripheral side section 32 of the clutch cover 28 constitutes the spring support section of the clutch cover assembly 8. By providing more than one function to such member, the number of required parts can be advantageously minimized. Furthermore, the pressure plate 51 and the cone spring 52 are received in the concaved section of the outer peripheral side section 32 axially facing the transmission side, and the elastic members 30, the drive member 29 and heads of the bolts 15 are received in the concaved section of the inner peripheral side section 32 axially facing the engine side, so that the entire arrangement is relatively compact in both the axial and radial directions. It is especially advantageous to arrange the elastic members 30 on the inner peripheral side of the pressure plate 51. By way of example, if the elastic members 30 of the damper mechanism 24 are axially disposed on the engine side of the pressure plate 51, an axial dimension of the entire apparatus is disadvantageously increased, and if the elastic members 30 of the damper mechanism 24 are arranged radially outward of the pressure plate 51, a radial dimension of the entire apparatus is disadvantageously increased.

Furthermore, the annular member 13 is arranged radially outward of the outer peripheral side section 32 of the clutch cover 28, so that a sufficient moment of inertia is ensured without increasing the axial and radial dimensions of the clutch apparatus 300.

As described above, the clutch cover assembly 8 is directly connected to the crankshaft 2 via the damper mechanism 24. As a result, the structure of the damper mechanism 24 is made to be relatively simple and compact, and therefore efficiency of assembly is advantageously improved.

The release mechanism 10" will now be described. The release mechanism 10" basically includes a cover assembly 54" and a drive mechanism 55". The cover assembly 54" is attached to the axial transmission side of the friction drive plate 23. That is, the cover assembly 54" is disposed on the opposite side of the friction drive plate 23 relative to the clutch cover assembly 8. The cover assembly 54" is a mechanism for disengaging the engaged clutch by applying a load from the drive mechanism 55", which will be described in greater detail below, to the pressure plate 51. The cover assembly 54" includes a cover member 57", a release member 58" and a lever member 59".

The cover member 57" is an annular plate member having an outer peripheral section 57a" engaging the outer peripheral side surface of the friction drive plate 23, a cylindrical section 57b" axially extending from an inner peripheral edge of the outer peripheral section 57a" toward the transmission side, and an inner peripheral section 57c" radially inwardly extending from the distal end of the cylindrical section 57b". The inner peripheral section 57c" is axially spaced apart from the axial transmission side surface of the friction drive plate 23. The outer peripheral section 57a" is secured to the outer peripheral section of the friction drive plate 23, for example, with bolts (not shown). On the inner peripheral section 57c", there is an annular protrusion 68 axially protruding toward the engine side.

Figure 10:
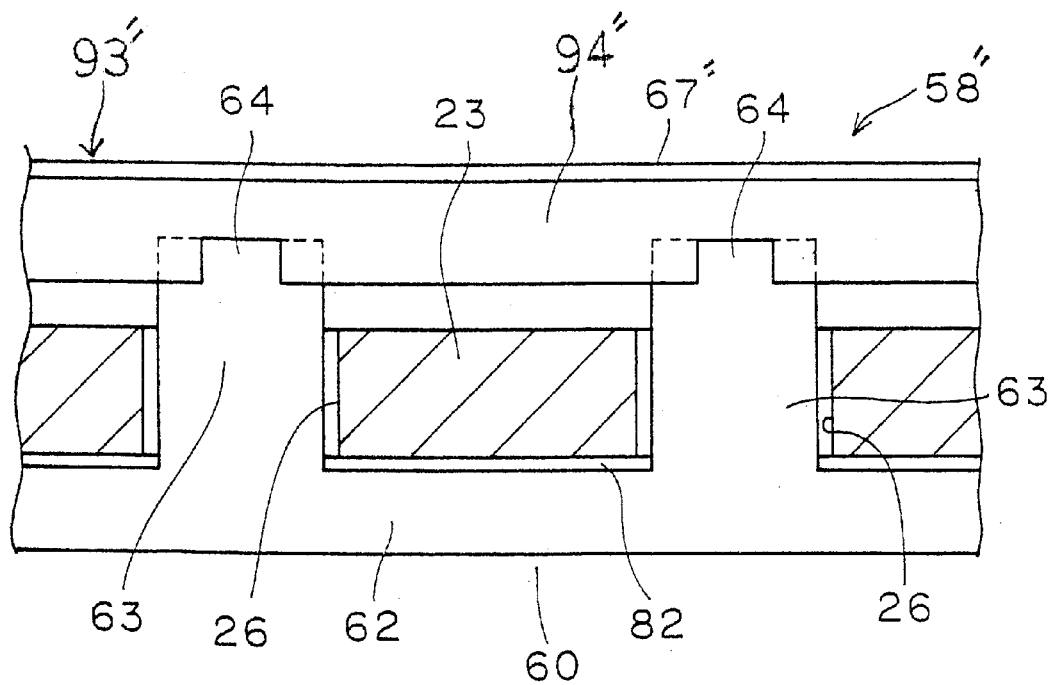
FIG. 10 is a partial top plan view illustrating the release member of the third embodiment of the present invention.
Figure 11:
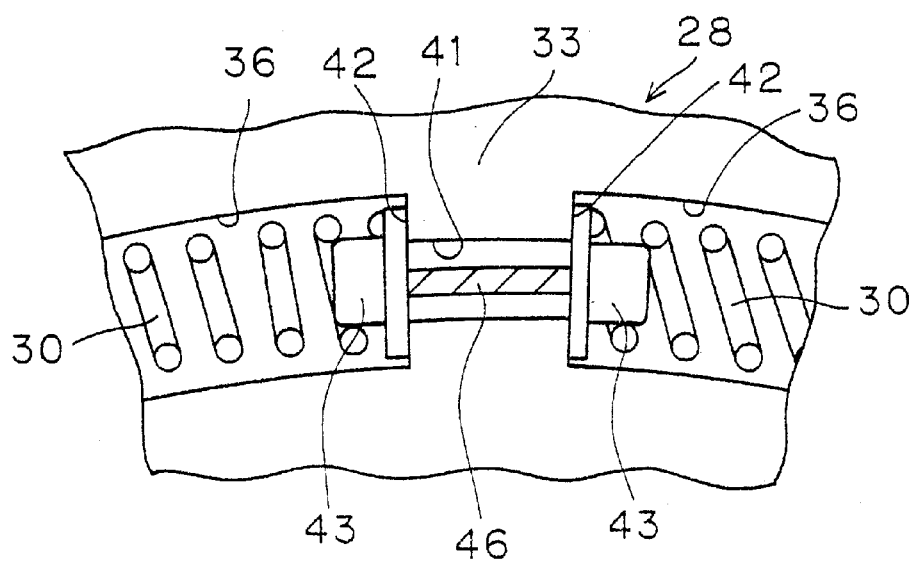
FIG. 11 is a partial side view illustrating the damper mechanism of the third embodiment of the present invention.

The release member 58" includes an axially extending drive member 60 and a support section constituting member 61". As shown in FIG. 10, the drive member 60 is a generally cylindrical member having an annular seat section 62 and a plurality of axially extending sections 63 axially extending from the seat section 62 toward the transmission side. The axial end of the seat section 62 on the engine side engages a groove 51c formed on the outer peripheral edge of the pressure plate 51 on the transmission side. The inner peripheral surface of the end of the seat section 62 is radially positioned by engagement with the outer peripheral surface of the groove 51c. With this annular seat section 62, the position of the drive member 60 relative to the pressure plate 51 is secured. Axially extending sections 63 extend through the corresponding axial through holes 26 of the friction drive plate 23 beyond the axial transmission side surface of the friction drive plate 23, as shown in FIGS. 9 and 10. The distal ends of the axially extending sections 63 are bent radially inwardly and further bent axially to form bent sections 64.

The support section constituting member 61" constitutes an annular support section for the drive member 60 and can be easily attached to and detached from the drive member 60 on the axial transmission side of the drive member 60. Furthermore, the support section constituting member 61" is a generally annular plate member and includes a disk-shaped section 93" and a cylindrical section 94" axially extending from the outer peripheral end of the disk-shaped section 93" on the transmission side. An annular protrusion 67" protruding axially on the transmission side is formed on the disk-shaped section 93". The annular protrusion 67" is positioned radially inward of the annular protrusion 68". The distal end of the cylindrical section 94" engages the outer peripheral sides of the bent sections 64. Furthermore, at the cylindrical section 94", there are flexed sections 66" that are cut and flexed so as to engage the corresponding inner peripheral sides of the bent sections 64. Each flexed section 66" is centered circumferentially on the corresponding bent section 64. With this arrangement, each bent section 64 is held radially between the cylindrical section 94" and the corresponding flexed section 66", and the support section constituting member 61" axially and radially immovably engages the distal end of each axially extending section 63.

The lever member 59" is an annular disk-shaped plate member. The outer peripheral section of the lever member 59" is axially disposed adjacent to the engine side of the inner peripheral section 57c" of the cover member 57". The annular protrusion 68" of the cover member 57" is positioned radially outward of the annular protrusion 67" of the support section constituting member 61", so that the outer peripheral end of the lever member 59" axially engages the annular protrusion 68" from the engine side, and a radially further inwardly located section of the lever member 59" axially engages the annular protrusion 67" from the transmission side. By way of example, the lever member 59" can be a disk-shaped plate having slits alternatively extending from its inner and outer peripheral edges so as to provide levers with no substantial elasticity. With the described arrangement, if the inner peripheral end of the lever member 59" axially moves toward the engine side, a section of the lever member 59" located radially inward of the outer peripheral end of the lever member 59" pivots toward the engine side while the annular protrusion 68" of the cover member 57" acts as a fulcrum for the lever member 59", so that the release member 58" is moved axially toward the engine side. As a result, the pressure plate 51 overcomes the urging force of the cone spring 52 and moves away from the clutch disk 82.

The drive mechanism 55 is a mechanism for releasing the clutch by actuating the lever member 59". The drive mechanism 55" basically includes a release bearing 69, a hydraulic cylinder 70 and a hydraulic circuit 71. The release bearing 69 basically includes inner and outer races and a plurality of rolling elements disposed therebetween and can support both the radial and thrust loads. A cylindrical member 72 is attached to the outer race of the release bearing 69. The cylindrical member 72 provided on the outer race of the release bearing 69 includes a cylindrical section 73 engaging the outer peripheral surface of the outer race, a second flange 75 radially inwardly extending from the axial engine side of the cylindrical section 73 and engaging the axial engine side surface of the outer race, and a first flange 74 radially outwardly extending from the axial transmission side of the cylindrical section 73.. The first flange 74 engages the axial transmission side of the inner peripheral end of the lever member 59".

The hydraulic cylinder 70 basically includes a hydraulic chamber constituting member 76 and a piston 77. A hydraulic chamber 79 is defined between the hydraulic chamber constituting member 76 and the piston 77 arranged radially inward of the hydraulic chamber constituting member 76. The hydraulic pressure can be supplied to the hydraulic chamber 79 from the hydraulic circuit 71. The piston 77 is a cylindrical member with its inner peripheral surface being supported by the outer peripheral surface of a cylindrical shaft 80 extending from the transmission side. The piston 77 includes a flange 78 engaging the axial engine side of the inner race of the release bearing 69. At this state, if the hydraulic fluid is drained into the hydraulic chamber 79 through the hydraulic circuit 71, the piston 77 axially moves toward the engine side so as to move the release bearing 69.

Figure 12:
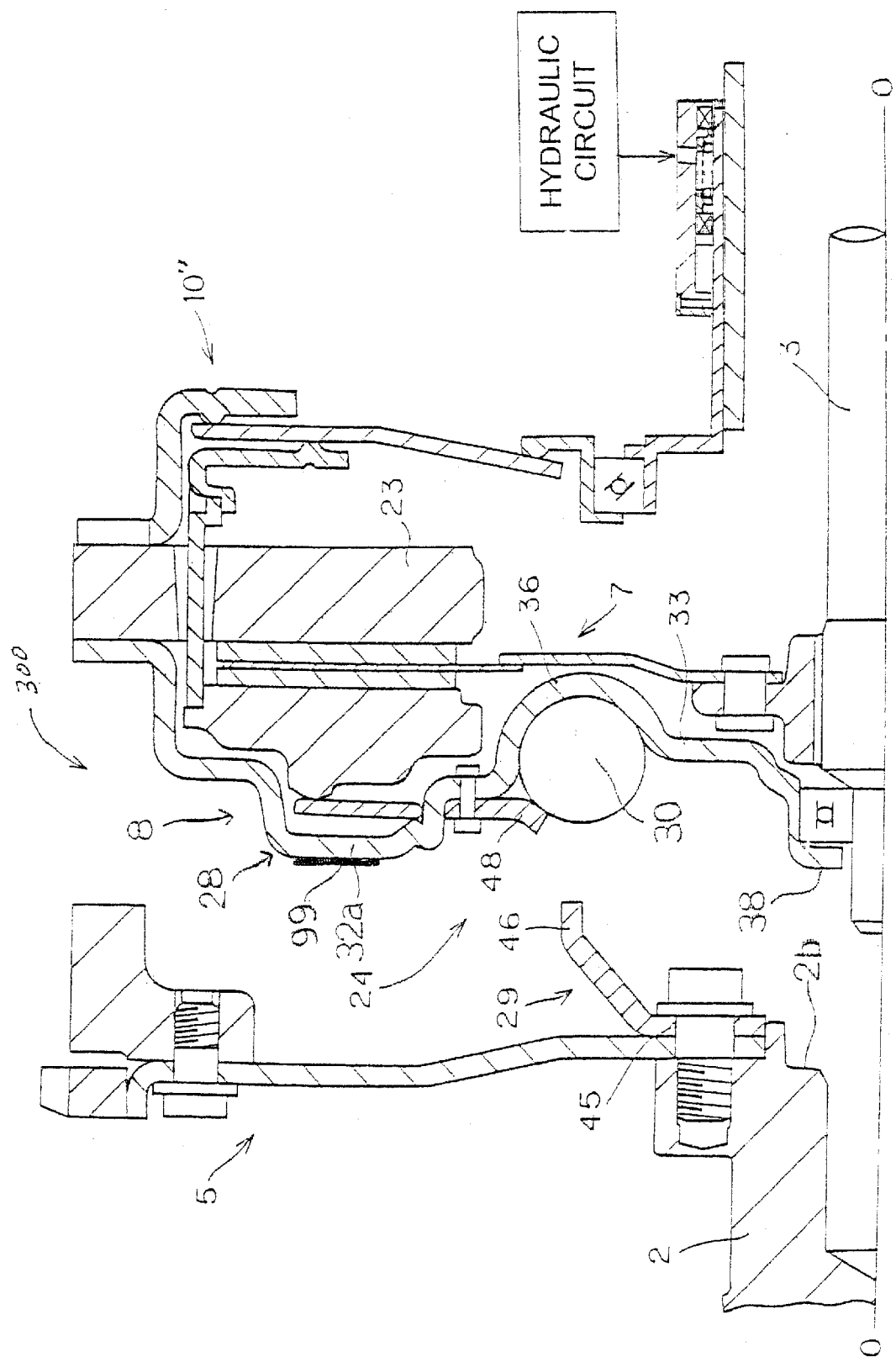
FIG. 12 is an exploded schematic longitudinal cross-sectional view of the clutch apparatus and the flywheel illustrated in FIG. 9 in accordance with the third embodiment of the present invention and illustrating the assembly operation of the clutch apparatus and the flywheel.

Assembly operation of the clutch apparatus 300 will now be described. With regard to the engine side construction, the mass body 5 and the drive member 29 are already secured to the distal end of the crankshaft 2 with the bolts 15, as shown in FIG. 12. Furthermore, the elastic members 30 are already mounted on the clutch cover 28. It means that the elastic members 30, which are the main constituting components of the damper mechanism 24, are already mounted on the component of the clutch cover assembly 8, i.e., the clutch cover 28 prior to the assembly operation. Therefore, transportation and storage of the clutch cover assembly 8 and the elastic members 30 prior to the assembly operation are eased.

From this state, for example, the engine and the crankshaft are axially moved toward the transmission side. With this movement, each engaging section 46 of the drive member 29 is axially inserted between a corresponding pair of the elastic members 30, more particularly, between a corresponding pair of the spring seats 43 from the transmission side. When the axial end surface 2b of the crankshaft 2 abuts the flange 38 of the clutch cover 28, the axial relative movement of the crankshaft 2 and the flange 38 is stopped. As described above, the assembly operation of the crankshaft 2 and the clutch cover assembly 8 is accomplished only by axially moving the crankshaft 2 and the clutch cover assembly 8 toward each other without requiring any fastening elements, such as bolts, rivets or the like. Therefore, the assembly operation of the clutch apparatus 300 according to the present invention is simplified and can be accomplished within a short period of time. In summary, the assembly of the clutch apparatus 300 is advantageously eased.

In the state shown in FIG. 9, if the hydraulic fluid is drained out from the hydraulic chamber 79 through the hydraulic circuit 71, the piston 77 axially moves toward the engine side. With this movement, the release bearing 69 axially moves the inner peripheral end of the lever member 59" toward the engine side. The lever member 59" pivots about the annular protrusion 68" of the cover member 57" acting as a fulcrum for the lever member 59" so as to move the release member 58" toward the engine side in an axial direction. As a result, the pressure plate 51 overcomes the urging force of the cone spring 52 and moves away from the clutch disk 82. At this point in time, the clutch cover 28,:especially the outer peripheral side section 32 of the clutch cover 28, is axially elastically flexed toward the engine side by the load axially applied to the clutch cover assembly 8 from the release bearing 69 toward the engine side. As a result, the friction facing 99 frictionally engages the disk-shaped member 12. That is, the clutch cover 28, which is the output side member of the damper mechanism 24, frictionally engages the disk-shaped member 12 that rotates integrally with the crankshaft 2, so that the clutch cover 28 rotates integrally with the disk-shaped member 12. In other words, both the clutch cover 28 and the friction drive plate 23 are locked to the crankshaft 2, so that the damper mechanism 24 is disabled. Therefore, when the resonance point is passed in the low engine speed range (for example, from 0 to 500 rpm) at the engine start up, the damages, the noises and/or the vibrations of the damper mechanism 24 due to the vibrational resonances are effectively minimized by the clutch releasing operation.

The described structures and operations can be summarized as follows. In the described clutch apparatus 300, when the clutch is released by applying the load to the clutch cover assembly 8 from the release mechanism 10", the friction facing 99 of the clutch cover 28 frictionally engages the disk-shaped member 12 due to the applied load. Here, since the damper mechanism 24 is made to be lockable by the load applied from the release mechanism 10" during the clutch releasing operation, the structure is relatively simple in comparison to that of the prior art. Particularly, since the lock mechanism includes the original known components, such as the disk-shaped member 12, or lock member, and the clutch cover 28, so that there is no need to provide a new specialized arrangement for accomplishing the described locking action.

Fourth Embodiment

Figure 13:
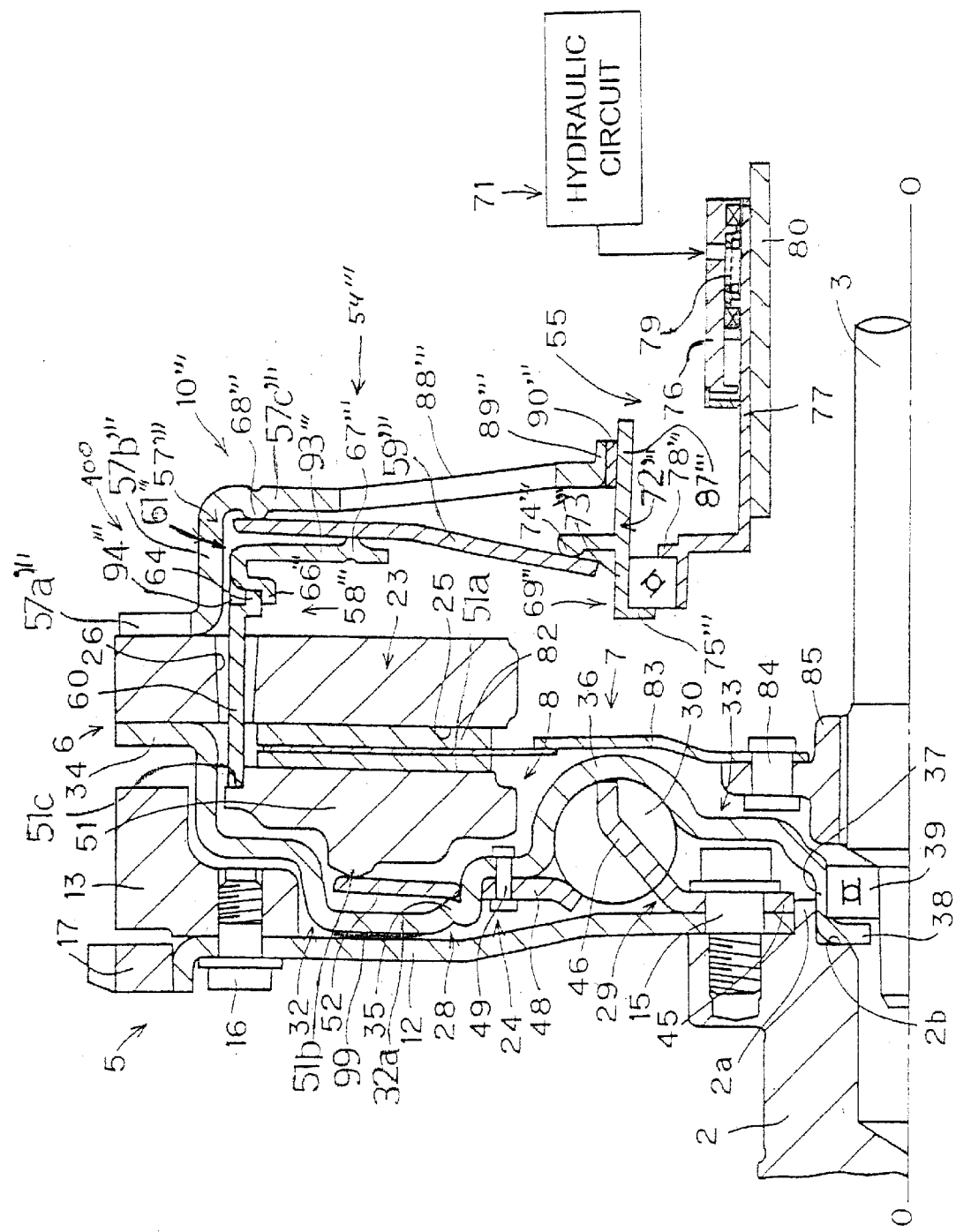
FIG. 13 is a schematic longitudinal cross-sectional view of a clutch apparatus and a flywheel coupled together in accordance with a fourth embodiment of the present invention.
Figure 14:
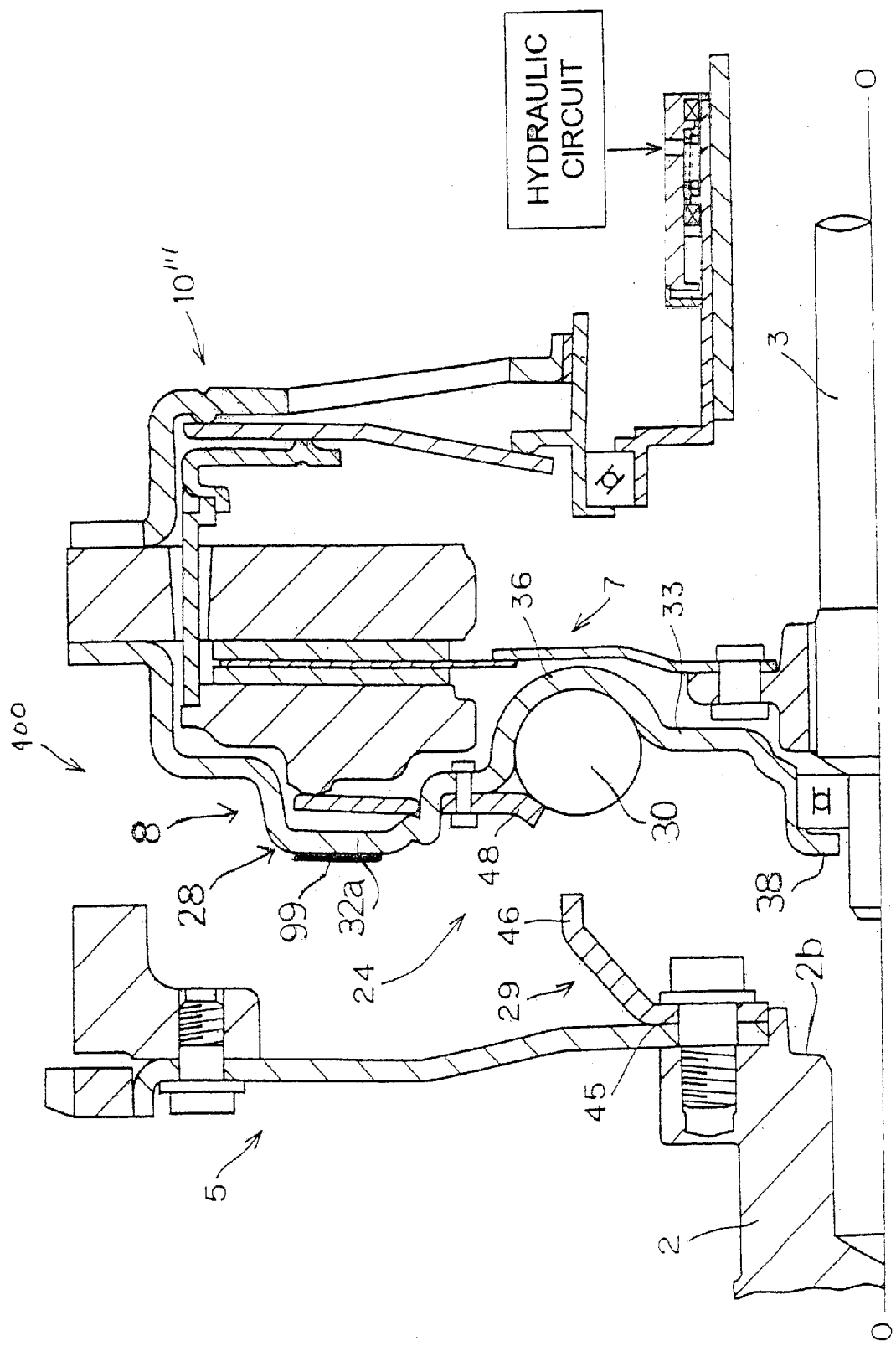
FIG. 14 is an exploded schematic longitudinal cross-sectional view of the clutch apparatus and the flywheel illustrated in FIG. 13 in accordance with the fourth embodiment of the present invention and illustrating the assembly operation of the clutch apparatus and the flywheel.

Referring now to FIGS. 13 and 14, a clutch apparatus 400 in accordance with the fourth embodiment of the present invention will now be discussed. In view of the similarities between this fourth embodiment and the first and third embodiments, discussed above, the components or parts of this fourth embodiment having the same function of the corresponding components or parts of the first and third embodiments are being given the identical reference numerals. Moreover, the explanations of components or parts and the operations of this fourth embodiment that are similar to components or parts and the operations of the first and third embodiments will be omitted. Only components and operations of this fourth embodiment that are different in structure and function from the first and third embodiments will be explained herein.

With reference to FIGS. 13 and 14, there is shown a schematic longitudinal cross sectional view of a clutch apparatus 400 according to a fourth embodiment of the present invention. The basic structure of the clutch apparatus 400 of this embodiment is similar to that of the third embodiment, so that the following description is only focused on the differences.

On the cylindrical section 73''' of the cylindrical member 72''', an extension 87''' axially extending on the transmission side is further provided. With this arrangement, the axially elongated outer peripheral surface 91''' is formed on the cylindrical member 72'''.

The inner peripheral section 57c''' of the cover member 57''' extends further radially inwardly in comparison to the above embodiment and forms an inner peripheral side extension 88'''. With this arrangement, an inner diameter of the inner peripheral section 57c''' is substantially equal to that of the lever member 59''', and therefore the inner peripheral end of the inner peripheral section 57c''' is located adjacent to the release bearing 69'''. The inner peripheral section 57c''' has a plurality of holes 88a''' formed in the inner peripheral side extension 88''' of the inner peripheral section 57c'''. At the inner peripheral edge of the inner peripheral side extension 88''', a cylindrical section 89''' axially extending on the transmission side is provided. A cylindrical member 90''' is secured to the inner peripheral side of the cylindrical section 89'''. The inner peripheral surface of the cylindrical member 90''' is supported by the outer peripheral surface 91''' of the extension 87'''. In the described arrangement consisting of the clutch cover assembly 8, the friction drive plate 23 and the cover assembly 54''', the cover member 57''' is the axially outermost member on the transmission side and is supported by the other member disposed on the transmission side. Therefore, the entire clutch apparatus 400 is not readily tilted by the bending vibrations transmitted from the engine and therefore can suppress the vibrational resonances induced by the bending vibrations of the engine. As a result, it is possible to reduce the thickness of the clutch cover 28.

Also, in the described arrangement consisting of the clutch cover assembly 8, the friction drive plate 23 and the cover assembly 54''', the clutch cover 28 is the axially outermost member on the engine side and is supported by the crankshaft 2 at its inner peripheral end, resulting in the clutch apparatus 400 being advantageously supported on both axial sides. Therefore, the vibrational resonances induced by the bending vibrations transmitted from the engine is further suppressed.

Since the release bearing 69''' is used as a support member for the inner peripheral end of the cover member 57''', a specialized support component and a space for accommodating it are not required. In other words, the cylindrical member 72''' includes the first flange 74''' for actuating the lever member 59''' as well as the extension 87''' for supporting the cover member 57'''. Furthermore, since the axially elongated cylindrical member 90''' is used at the inner peripheral side extension 88''', the relatively long axial engagement between the inner peripheral surface of the cover member 57''' and the corresponding member can be accomplished, so that the cover member 57''' can further resist the tilting. A material with a low coefficient of friction can be used for the cylindrical member 90''' to reduce the sliding resistance between the engaging sections as the release bearing 69''' moves axially.

Modifications

The present invention is not limited to the embodiments described above. The present invention can be adapted in other different clutch apparatuses, such as a clutch apparatus including the clutch cover assembly axially disposed on the transmission side of the friction drive plate, or a clutch apparatus that allows two outputs on the axially opposing sides of the friction drive plate by providing another clutch cover assembly.

As described above, in the clutch apparatus of the present invention, since the damper mechanism is made to be lockable by the load applied from the release mechanism during the clutch releasing operation, the entire structure is relatively simple in comparison to that of the prior art.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a clutch cover assembly being configured and so dimensioned to engage and disengage the clutch disk; and a damper mechanism being configured to be coupled to said clutch cover assembly and configured and so dimensioned to be coupled to the crankshaft such that said clutch cover assembly is elastically connected to the crankshaft in a rotational direction, said damper mechanism including at least one elastic member being retained by one of the crankshaft and said clutch cover assembly and axially releasably engaging the other of the crankshaft and said clutch cover assembly, said elastic member being configured to contact a portion fixed to said other of the crankshaft and said clutch cover assembly.

2. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a clutch cover assembly being configured and so dimensioned to engage and disengage the clutch disk; and a damper mechanism being configured to be coupled to said clutch cover assembly and configured and so dimensioned to be coupled to the crankshaft such that said clutch cover assembly is elastically connected to the crankshaft in a rotational direction, said damper mechanism including at least one elastic member being retained by one of the crankshaft and said clutch cover assembly and axially releasably engaging the other of the crankshaft and said clutch cover assembly, said damper mechanism including a plate member and a drive member, said plate member being configured and so dimensioned to be axially disposed on an engine side of a distal end of the crankshaft, said elastic member being retained by said plate member at both circumferential ends and an axial transmission side thereof, said drive member having an engaging section that axially releasably engages both circumferential ends of said elastic member and is adapted to be secured to the crankshaft.

3. A clutch apparatus according to claim 2, wherein said plate member includes a retaining section configured and so dimensioned to retain an axial engine side of said elastic member.

4. A clutch apparatus according to claim 2, wherein said clutch cover assembly further includes a friction drive plate being configured and so dimensioned to be axially disposed on an axial transmission side of the clutch disk.

5. A clutch apparatus according to claim 4, wherein said clutch cover assembly further includes a pressure plate axially disposed on the engine side of said clutch disk assembly, and an urging member supported by said plate member to urge said pressure plate toward said clutch disk.

6. A clutch apparatus according to claim 5, wherein said elastic member is disposed radially inward of said pressure plate.

7. A clutch apparatus according to claim 4, wherein said plate member has an outer peripheral end secured to said friction drive plate and an inner peripheral end rotatably supported by the crankshaft.

8. A clutch apparatus according to claim 7, further including a bearing disposed between said inner peripheral end of said plate member and the input shaft.

9. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a friction drive plate being configured and so dimensioned to be axially disposed on a transmission side of the clutch disk; and a clutch cover assembly including a clutch cover being secured to an axial engine side of said friction drive plate, a pressure plate being configured and so dimensioned to be disposed adjacent to an axial engine side of the clutch disk, an urging member being configured to be supported on an axial engine side of said pressure plate by said clutch cover to urge said pressure plate toward said friction drive plate, and an elastic member being retained by an axial engine side of an inner peripheral section of said clutch cover and to receive a driving force from the crankshaft.

10. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a friction drive plate being configured and so dimensioned to be axially disposed on a transmission side of the clutch disk; and a clutch cover assembly including a clutch cover being secured to an axial engine side of said friction drive plate, a pressure plate being configured and so dimensioned to be disposed adjacent to an axial engine side of the clutch disk, an urging member being configured to be supported by said clutch cover to urge said pressure plate toward said friction drive plate, and an elastic member being retained by an axial engine side of an inner peripheral section of said clutch cover and to receive a driving force from the crankshaft, said elastic member being retained by said inner peripheral section of said clutch cover and being positioned radially inward of said pressure plate.

11. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a friction drive plate being configured and so dimensioned to be axially disposed on a transmission side of the clutch disk;

a clutch cover assembly including a clutch cover being secured to an axial engine side of said friction drive plate, a pressure plate being configured and so dimensioned to be disposed adjacent to an axial engine side of the clutch disk, an urging member being disposed between said clutch cover and said pressure plate, said urging member being configured to be supported by said clutch cover to urge said pressure plate toward said friction drive plate, and an elastic member being retained by an axial engine side of an inner peripheral section of said clutch cover and to receive a driving force from the crankshaft; and a mass body being configured and so dimensioned to be secured to the crankshaft.

12. A clutch apparatus according to claim 11, wherein
said mass body includes a disk-shaped member with inner peripheral end being configured and so dimensioned to be secured to the crankshaft, and an annular member secured to an outer peripheral end of said disk-shaped member.

13. A clutch apparatus for enabling and disabling transmission of a driving fore from a crankshaft of an engine to an input shaft of a transmission by engaging and disengaging a clutch disk coupled to the input shaft of the transmission, said clutch apparatus comprising:

a friction drive plate being configured and so dimensioned to be axially disposed on a transmission side of the clutch disk;

a clutch cover assembly including a clutch cover, a pressure plate, and an urging member, said clutch cover being secured on an axial engine side of said pressure plate, said pressure plate being configured and so dimensioned to be axially disposed on an engine side of the clutch disk, said urging member being supported by said clutch cover to urge said pressure plate toward the clutch disk; and a release mechanism including a cover member secured to an axial transmission side of said friction drive plate said cover member having an inner peripheral end supported by a member disposed on said transmission side, a release member having one end engaging an axial transmission side surface of said pressure plate and an other end disposed adjacent to said cover member, a lever member being arranged to be supported by said cover member and said other end of said release member, and a drive mechanism being configured and so dimensioned to move said pressure plate axially toward said engine side via said release member by actuating said lever member.

14. A clutch apparatus according to claim 13, wherein
said drive mechanism further includes a release bearing that has an inner race, an outer race providing a load to said lever member, and a plurality of rolling elements disposed between said inner and outer races such that said inner peripheral end of said cover member is supported by said outer race.

15. A clutch apparatus according to claim 14, further including
a cylindrical member that is secured to said outer race and has an outer peripheral surface being configured and so dimensioned to axially slidably support an inner peripheral surface of said cover member.

16. A clutch apparatus according to claim 15, wherein
said cylindrical member includes a cylindrical section having said outer peripheral surface, and an engaging section being configured and so dimensioned to engage said lever member.

17. A clutch apparatus according to claim 13, wherein
said clutch cover has an outer peripheral end secured to said friction drive plate and an inner peripheral end being configured and so dimensioned to be rotatably supported by the crankshaft.

18. A clutch apparatus according to claim 17, wherein
said inner peripheral end of said clutch cover is configured and so dimensioned to be radially supported by the crankshaft and axially supported on its engine side by the crankshaft.

19. A clutch apparatus according to claim 18, further including
a bearing disposed between said inner peripheral end of said clutch cover and the input shaft.

20. A clutch apparatus according to claim 17, further including
a bearing disposed between said inner peripheral end of said clutch cover and the input shaft.

21. A clutch apparatus for enabling and disabling transmission of a driving force from a crankshaft of an engine to an input shaft of a transmission by engaging and disengaging a clutch disk coupled to the input shaft of the transmission, said clutch apparatus comprising:

a friction drive plate being configured and so dimensioned to be axially disposed on one side of the clutch disk;

a clutch cover assembly including a clutch cover secured to a clutch disk side of said friction drive plate, a pressure plate axially disposed on a side of the clutch disk away from said friction drive plate, and an urging member supported by said clutch cover for urging said pressure plate toward the clutch disk;

a damper mechanism including an elastic member being configured to connect elastically said clutch cover assembly to the crankshaft in a rotational direction;

a release mechanism being configured to move said pressure plate away from the clutch disk by applying a load to said clutch cover assembly; and a relative rotation limiting mechanism being configured and so dimensioned to connect said clutch cover assembly to a relative rotation limiting member disposed on the crankshaft side by said load applied from said release mechanism to said clutch cover assembly.

22. A clutch apparatus according to claim 21, wherein
said release mechanism being configured and so dimensioned to move said pressure plate away from the clutch disk by axially applying said load to said clutch cover assembly toward an engine side such that said relative rotation limiting mechanism urges said clutch cover assembly from the transmission side toward the engine side against said relative rotation limiting member disposed on the crankshaft side via said load axially applied from said release mechanism to said clutch cover assembly.

23. A clutch apparatus according to claim 21, further including
a lock member that is secured to said crankshaft and acts as said member disposed on the crankshaft side.

24. A clutch apparatus according to claim 23, wherein said lock member is a disk-shaped member.

25. A clutch apparatus according to claim 24, wherein
said clutch cover assembly is axially disposed on the engine side of said friction drive plate, and
a part of said clutch cover constitutes said relative rotation limiting mechanism.

26. A clutch apparatus according to claim 25, further including
a friction member disposed between said part of said clutch cover and a member disposed on a clutch cover side.

* * * * *